US012617020B2

(12) United States Patent
Guo et al.

(10) Patent No.: US 12,617,020 B2
(45) Date of Patent: May 5, 2026

(54) PRECISION FREEFORM STRUCTURING FOR THE FABRICATION OF CODED LENSES

(71) Applicant: Northwestern University, Evanston, IL (US)

(72) Inventors: Ping Guo, Northfield, IL (US); Yaoke Wang, Evanston, IL (US)

(73) Assignee: Northwestern University, Evanston, IL (US)

( * ) Notice: Subject to any disclaimer, the term of this patent is extended or adjusted under 35 U.S.C. 154(b) by 1040 days.

(21) Appl. No.: 17/729,915

(22) Filed: Apr. 26, 2022

(65) Prior Publication Data

US 2022/0355387 A1 Nov. 10, 2022

Related U.S. Application Data

(60) Provisional application No. 63/180,388, filed on Apr. 27, 2021.

(51) Int. Cl.
*B23B 5/40* (2006.01)

(52) U.S. Cl.
CPC ...................................... *B23B 5/40* (2013.01)

(58) Field of Classification Search
None
See application file for complete search history.

(56) References Cited

U.S. PATENT DOCUMENTS

| | | | | |
|---|---|---|---|---|
| 3,840,791 | A * | 10/1974 | Mack | G05B 19/182 |
| | | | | 700/188 |
| 5,396,821 | A * | 3/1995 | Okumura | B23B 1/00 |
| | | | | 82/134 |
| 6,206,621 | B1 * | 3/2001 | Sebring | B23Q 11/0046 |
| | | | | 409/137 |
| 7,240,412 | B2 * | 7/2007 | Sasazawa | B23P 23/02 |
| | | | | 82/149 |
| 7,506,423 | B2 * | 3/2009 | Iwabuchi | B23B 3/065 |
| | | | | 82/122 |
| 7,861,624 | B2 * | 1/2011 | Kunimatsu | B23B 29/125 |
| | | | | 82/1.11 |
| 8,656,815 | B2 * | 2/2014 | Morimoto | B23B 1/00 |
| | | | | 82/1.11 |
| 9,815,120 | B2 * | 11/2017 | Amaya | B23B 5/36 |
| 9,975,211 | B2 * | 5/2018 | Hariki | B23Q 5/22 |
| 10,507,532 | B2 * | 12/2019 | Wielandts | B23B 31/28 |
| 12,090,596 | B2 * | 9/2024 | Sannomiya | B23Q 5/58 |

(Continued)

OTHER PUBLICATIONS

Huang, Rui, et al., "Profile evaluation of radial Fresnel lens directly machined on roller molds by rotating-tool diamond turning", Precision Engineering 50, 2017, pp. 44-52.

(Continued)

*Primary Examiner* — Jason Lin
(74) *Attorney, Agent, or Firm* — Benesch Friedlander Coplan & Aronoff LLP

(57) ABSTRACT

A system for fabricating coded lenses includes a cutting tool configured to controllably cut a workpiece at a specified position-dependent depth while traversing a surface of the workpiece along a specified two-dimensional path. A signal generator is operative to generate a signal for controlling fabrication of a coded lens from the workpiece. A vibration tool is operative to ultrasonically vibrate the cutting tool for cutting of gratings on the workpiece.

17 Claims, 37 Drawing Sheets

(56)              References Cited

U.S. PATENT DOCUMENTS

2007/0095175 A1*   5/2007   Ostendarp ................ B23Q 1/36
                                            82/1.11
2007/0097492 A1*   5/2007   Takasu ................. G02B 5/1895
                                          359/362

OTHER PUBLICATIONS

Yang, Yang, et al., "Structural coloration of metallic surfaces with micro/nanostructures induced by elliptical vibration texturing" Applied Surface Science 402, 2017, pp. 400-409.
Wang, Jianjian, et al., "Fabrication of structurally colored basso-relievo with modulated elliptical vibration texturing" Precision Engineering 64, 2020, pp. 113-121.

* cited by examiner

310

330

Gratings
320

330

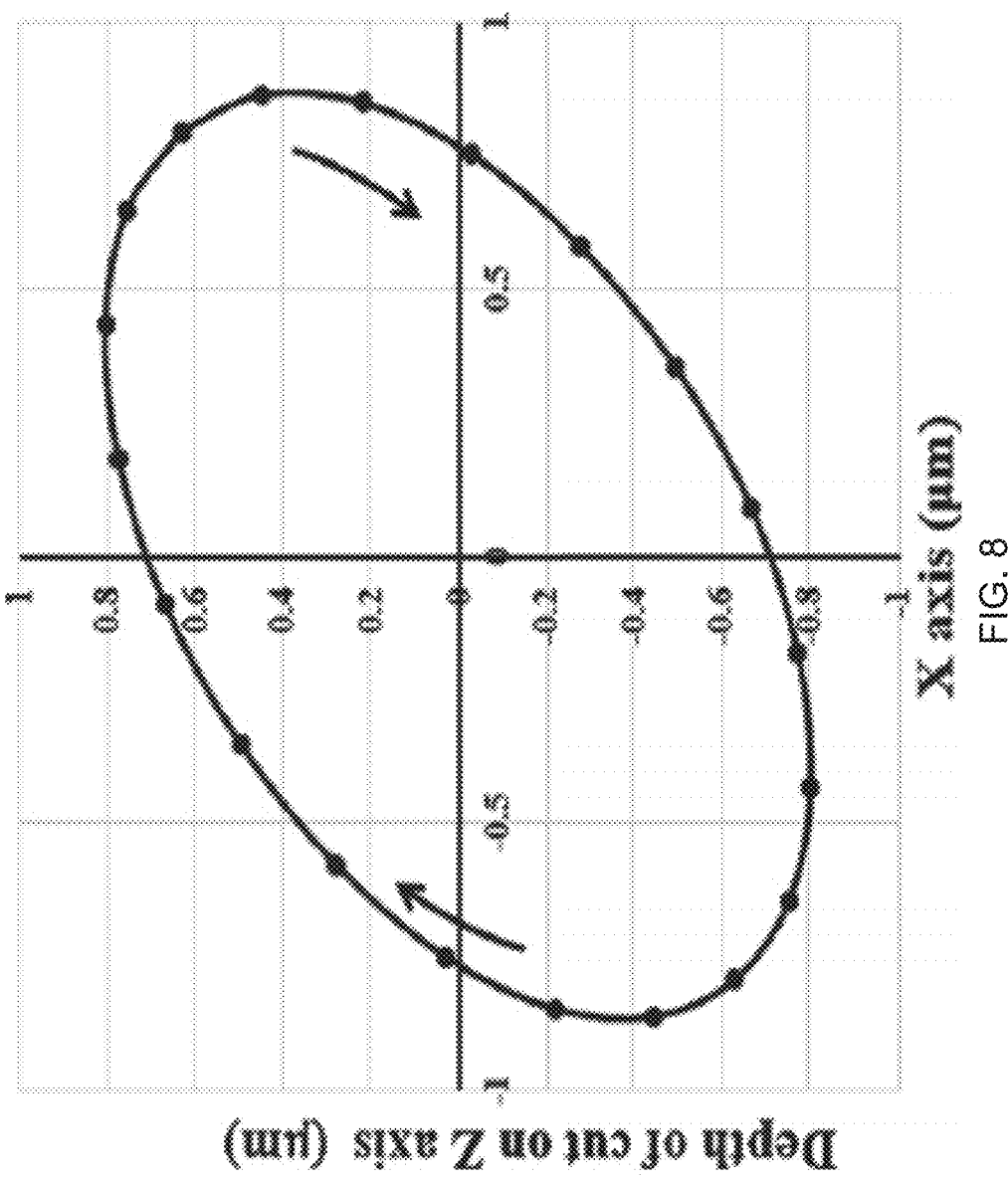
FIG. 8
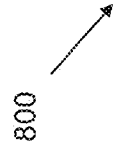

1100

2 mm

1200

2 mm

1310

1320

1410

1420

1800

1910

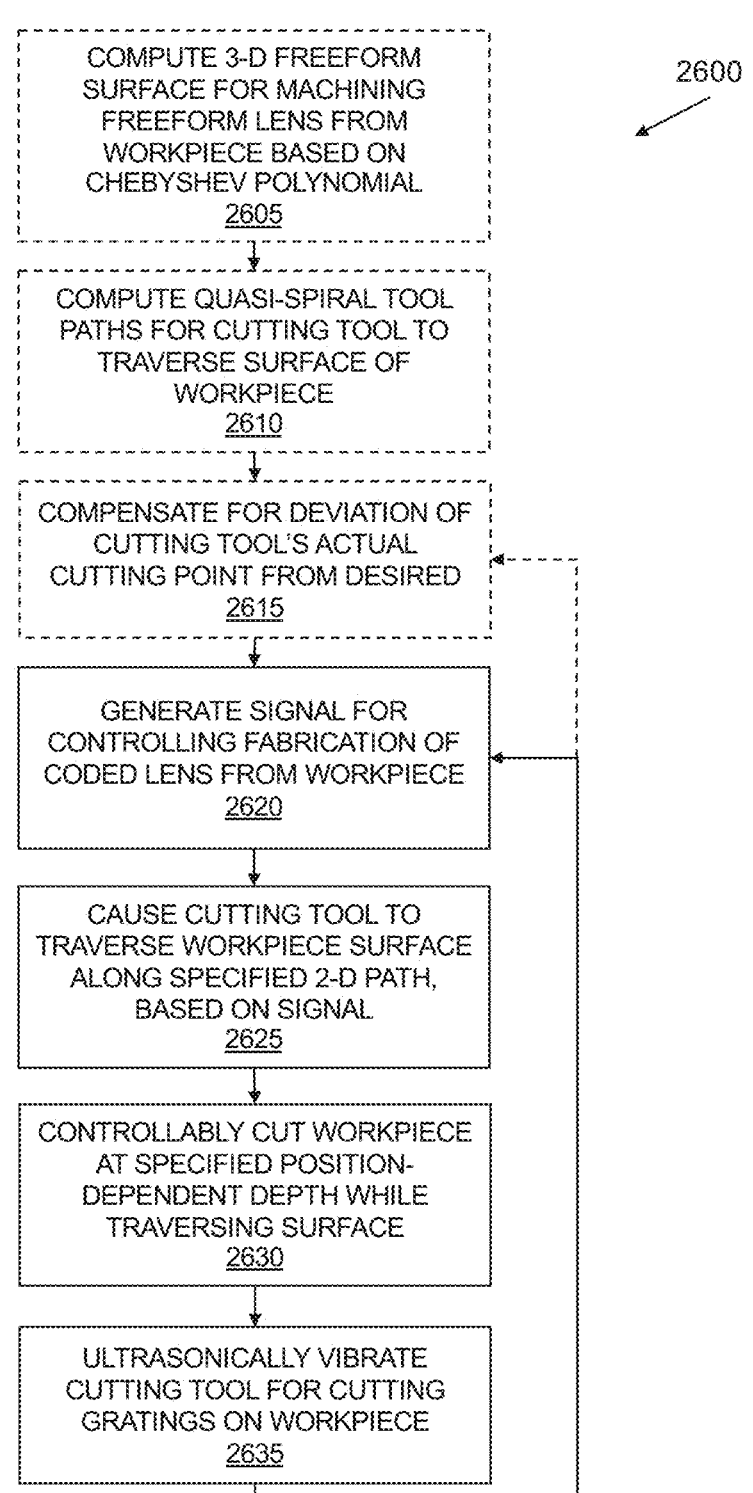

COMPUTE 3-D FREEFORM
SURFACE FOR MACHINING
FREEFORM LENS FROM
WORKPIECE BASED ON
CHEBYSHEV POLYNOMIAL
2605

COMPUTE QUASI-SPIRAL TOOL
PATHS FOR CUTTING TOOL TO
TRAVERSE SURFACE OF
WORKPIECE
2610

COMPENSATE FOR DEVIATION OF
CUTTING TOOL'S ACTUAL
CUTTING POINT FROM DESIRED
2615

GENERATE SIGNAL FOR
CONTROLLING FABRICATION OF
CODED LENS FROM WORKPIECE
2620

CAUSE CUTTING TOOL TO
TRAVERSE WORKPIECE SURFACE
ALONG SPECIFIED 2-D PATH,
BASED ON SIGNAL
2625

CONTROLLABLY CUT WORKPIECE
AT SPECIFIED POSITION-
DEPENDENT DEPTH WHILE
TRAVERSING SURFACE
2630

ULTRASONICALLY VIBRATE
CUTTING TOOL FOR CUTTING
GRATINGS ON WORKPIECE
2635

PRECISION FREEFORM STRUCTURING FOR THE FABRICATION OF CODED LENSES

CROSS REFERENCE TO RELATED APPLICATIONS

The present application claims the benefit of priority under 35 U.S.C. § 119 from U.S. Provisional Patent Application Ser. No. 63/180,388 entitled "Precision Freeform Structuring for the Fabrication of Coded Lenses," filed on Apr. 27, 2021, the disclosure of which is hereby incorporated by reference in its entirety for all purposes.

TECHNICAL FIELD

The present disclosure generally relates to optical lenses, and more specifically relates to precision freeform structuring for the fabrication of coded lenses.

BACKGROUND

Integrated optical systems may include hybrid optical devices that integrate one or more of lenses, mirrors, and gratings. Mirrors provide the functionality of reflection, lenses provide the functionality of refraction, and gratings provide the functionality of diffraction. Examples of integrated optical systems include spectrometers, holographic projection systems, and integrated waveguides and gratings on semiconductor substrates such as silicon (Si). Fabrication processes for integrated optical systems include multi-step ruling and electron-beam (E-beam) processes.

The description provided in the background section should not be assumed to be prior art merely because it is mentioned in or associated with the background section. The background section may include information that describes one or more aspects of the subject technology.

SUMMARY

According to certain aspects of the present disclosure, a system for fabricating coded lenses includes a cutting tool configured to controllably cut a workpiece at a specified position-dependent depth while traversing a surface of the workpiece along a specified two-dimensional path; a signal generator operative to generate a signal for controlling fabrication of a coded lens from the workpiece; and a vibration tool operative to ultrasonically vibrate the cutting tool for cutting of gratings on the workpiece.

The cutting tool may be configured to machine a freeform surface and fabricate a variable grating on the machined freeform surface.

The cutting tool may be configured to rotate to cut the workpiece in directions that are perpendicular to local gradients on the workpiece.

The system may include a vacuum to remove cut material from the cutting tool while the cutting tool is cutting the workpiece.

The system may include a mechanism to feed the workpiece linearly along an axis relative to the cutting tool while the cutting tool cuts the workpiece.

The system may include a spindle operative to hold the workpiece and turn the workpiece about a central axis to facilitate the cutting tool to cut the workpiece while the workpiece is turning.

The vibration tool may include an elliptical vibration tool.

According to certain aspects of the present disclosure, a method for fabricating coded lenses includes generating a signal for controlling fabrication of a coded lens from a workpiece; causing a cutting tool to traverse a surface of the workpiece along a specified two-dimensional path, based on the signal; controllably cutting a workpiece at a specified position-dependent depth while traversing the surface of the workpiece along the specified two-dimensional path, based on the signal; and ultrasonically vibrating the cutting tool for cutting gratings on the workpiece.

The method may further include computing a three-dimensional freeform surface for machining a freeform lens from the workpiece, wherein computing the three-dimensional freeform surface is based on a Chebyshev polynomial:

$$Z = f_z(X, Y) = -\left( \frac{c(X^2 + Y^2)}{1 + \sqrt{1 - c^2(X^2 + Y^2)}} + \sum_{i=0}^{I}\sum_{j=0}^{J} C_{ij}T_i\left(\frac{X}{L_x}\right)T_j\left(\frac{X}{L_y}\right) \right) + Z_o$$

$$T_i(x) = \cos(i\arccos x)$$

where x, y, z are global coordinates; X, Y, Z are workpiece coordinates; $\rho$, $\theta$ are workpiece polar coordinates; $\varphi$ is spindle angular position; $Z=f_z(X,Y)$ is the freeform surface function; $Z_0$ is the reference depth; $T_i(x)$ is the $i^{th}$ order Chebyshev polynomials at x; $C_{ij}$ is the 2-D Chebyshev polynomials coefficient; i, j are the order of Chebyshev polynomials; I, J are the maximum order of Chebyshev polynomials; c is the curvature of toric term; $h_n$ is the $n^{th}$ thread (facet) depth; N is the maximum index of thread (facet); $f_c(X, Y)=0$ is the contour profile of the $n^{th}$ thread; k, K are the index and maximum index of discretized $\theta$; $M_n$ is the number of revolutions in the $n^{th}$ thread; and m is the index of revolution.

The method may further include causing the cutting tool to traverse the surface of the workpiece based on the Chebyshev polynomial to machine a freeform surface.

Causing the cutting tool to traverse the surface of the workpiece along the specified two-dimensional path may comprise feeding the workpiece along a linear direction at a variable rate.

Causing the cutting tool to traverse the surface of the workpiece along the specified two-dimensional path may comprise causing the cutting tool to traverse the surface of the workpiece along quasi-spiral tool paths computed according to $$M_n \approx \frac{h/\Delta r}{\min_{1,\dots,K}\|\nabla f(X_{k,n}, Y_{k,n})\|},$$

where at a revolution m from 1 to $M_n$, the quasi-spiral tool path is computed by the interpolation, where the $k^{th}$ point on the $m^{th}$ revolution is labelled as $(X_{k,m}, Y_{k,m})$, where $$X_{m,n} = \frac{m(k-1)}{M_n K}(X_{k,n+1} - X_{k,n}) + X_{k,n},$$

$$Y_{k,m} = \frac{m(k-1)}{M_n K}(Y_{k,n+1} - Y_{k,n}) + Y_{k,n},$$

$$Z_{k,m} = f_z(X_{k,m}, Y_{k,m}) - (n-1)h + e_h(X_{k,m}, Y_{k,m}),$$

where $e_h$ $(X_{k,m}, Y_{k,m})$ is the tool compensation term.

The specified two-dimensional path may be computed according to $$\begin{bmatrix} X_{k,m} \\ Y_{k,m} \\ \nabla_x f(X_{k,m}, Y_{k,m}) \\ \nabla_y f(X_{k,m}, Y_{k,m}) \end{bmatrix} = \begin{bmatrix} \cos(\varphi_{k,m}) & \sin(\varphi_{k,m}) & 0 & 0 \\ -\sin(\varphi_{k,m}) & \cos(\varphi_{k,m}) & 0 & 0 \\ 0 & 0 & \cos(\varphi_{k,m}) & \sin(\varphi_{k,m}) \\ 0 & 0 & -\sin(\varphi_{k,m}) & \cos(\varphi_{k,m}) \end{bmatrix} \begin{bmatrix} x_{k,m} \\ y_{k,m} \\ -1 \\ 0 \end{bmatrix},$$

$$\frac{\partial f(X,Y)}{\partial X} =$$

$$\frac{cX}{\sqrt{1 - c^2(X^2 + Y^2)}} + \sum_{i=0}^{I}\sum_{j=0}^{J} C_{ij} \frac{i\sin\left(i\arccos\left(\frac{X}{L_x}\right)\right)}{\sqrt{1 - \left(\frac{X}{L_x}\right)^2}} \cos\left(j\arccos\left(\frac{Y}{L_y}\right)\right),$$

$$\frac{\partial f(X,Y)}{\partial Y} =$$

$$\frac{cX}{\sqrt{1 - c^2(X^2 + Y^2)}} + \sum_{i=0}^{I}\sum_{j=0}^{J} C_{ij} \cos\left(i\arccos\left(\frac{X}{L_x}\right) \frac{j\sin\left(j\arccos\left(\frac{X}{L_x}\right)\right)}{\sqrt{1 - \left(\frac{X}{L_y}\right)^2}}\right),$$

such that the cutting tool's trajectory in the workpiece coordinate system (X, Y, Z) is on the desired quasi-spiral, and the cutting direction is perpendicular to the local gradient.

The method may further include compensating for a deviation of a cutting tool's actual cutting point from the desired cutting point on the workpiece by computing $e_h$ according to $$e_h = R\tan(\beta)\tan\left(\frac{\beta}{2}\right)$$

$$\beta = \arctan(\|\nabla f_z(X, Y)\|),$$

and adjusting the cutting tool's actual cutting point based on $e_h$.

According to certain aspects of the present disclosure, a process combines ultrasonic tool vibration and coordinated multi-axis motion to achieve the simultaneous generation of variable gratings and freeform surfaces. Processing capabilities can be enabled to fabricate hybrid optics where freeform optical surfaces are superimposed with high-frequency variable gratings. Processing capabilities may enable the single-element design with integrated imaging and diffraction functions, which combines the power of grating-based spectroscopy and freeform optics. The adoption of such hybrid optics provides substantial performance enhancement in spectral imaging and spectrometry in terms of 5-10 times reduction in device volume, 3-5 times improvement in bandwidth, 2-4 times increase in signal-to-noise ratios, as well as functionality such as, but not limited to, multi-wavelength sensing enabled by the programmable grating spacing. Compact and high-performance spectrometers thus can be designed for critical applications in space exploration, remote sensing, hazard assessment, climate monitoring, and other applications in the industry.

According to certain aspects of the present disclosure, systems and methods utilize ultrasonic vibration trajectories of a single-point diamond cutting tool to fast imprint nano-scale gratings at the rate of 20-5 k per second. Individual grating spacing and profile may be dynamically tuned by adjusting the nominal cutting velocity and vibration trajectories. One-step fabrication of hybrid optics, or freeform structuring, may then be achieved by combing vibration texturing and coordinated multi-axis motion. Compared with diamond turning and ruling, the systems and methods described herein reduce the prototyping cycles from several weeks to several hours in duration, enable the flexibility to control the spatial distribution of grating spacing and profiles, and improve the fidelity by combining the surface generation and grating fabrication in a single step.

According to certain aspects of the present disclosure, a system may be provided for performing the method for fabricating coded lenses. The system may include a memory storing instructions and a processor configured to execute the instructions. The stored instructions may, when executed, cause the processor to perform the method for remotely allocating bandwidth among content consumers on the computing network.

According to certain aspects of the present disclosure, a non-transitory machine-readable storage medium having instructions stored thereon for causing a processor to execute the method for fabricating coded lenses may be provided.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIG. 8 illustrates a trajectory of the diamond cutter tool along the X-axis and the depth of cut (CUT) on the Z-axis.

FIG. 26 is a flow chart that illustrates a method of fabricating hybrid optics comprising high-frequency variable gratings superimposed on freeform optical surfaces.

Figure 1:
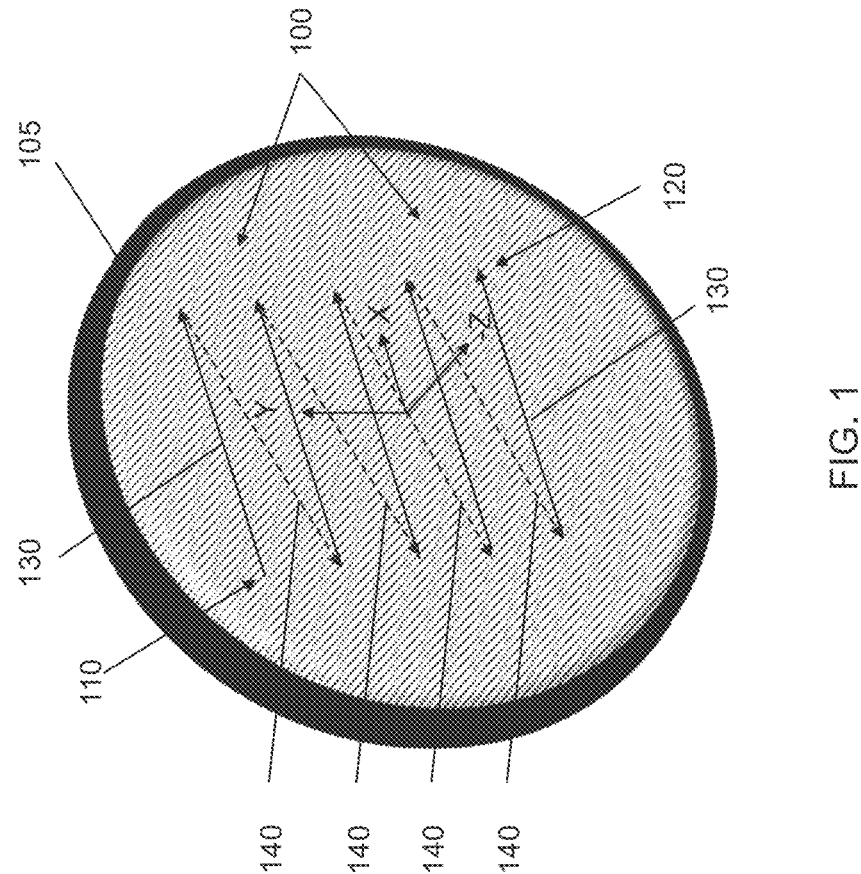
FIG. 1 illustrates a schematic of an exemplary grating formation mechanism tool path on a workpiece in a scanning mode from a starting point to an end point for fabricating a grating.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Coded lenses as described herein may include a combination of variable gratings and freeform optics. Coded lenses combine the power of grating-based spectroscopy and freeform optics, as well as create new functionalities, such as multi-wavelength sensing enabled by the programmable grating spacing. The ability to create and the adoption of such coded lenses will lead to substantial performance enhancements in spectral imaging and spectrometry in terms of 5-10 times reduction in device volume, 3-5 times improvement in bandwidth, 2-4 times increase in signal-to-noise ratios, as well as to new functionalities such as multi-wavelength sensing enabled by the programmable grating spacing. Compact and high-performance spectrometers thus can be designed for critical applications in space exploration, remote sensing, hazard assessment, climate monitoring, etc.

To date, the fabrication of gratings on freeform surfaces remains a fundamental challenge both in academia and industry. The predominant method is to use ultraprecision diamond turning to generate a freeform surface and then use a modified ruling engine to fabricate gratings. This route, however, suffers from low speed at one continuous groove per few seconds, the inability to tune the grating profile due to the fixed tool geometry and the limited capability to control grating spacing in more than one dimension due to the fixed linear motion.

Freeform structuring as described herein may integrate 3D tool vibration and coordinated multi-axis motion to achieve the simultaneous generation of voxelated gratings and freeform surfaces. The tool's overlapping trajectories will imprint nano-scale gratings on the machined surfaces due to the coupled material removal from the cutting edge and the compression of the tool's "vibrating" faces. The voxelated gratings refer to the capability of dynamic control over the grating profiles and spacing with nanoscale profiles and spacing in each voxel. Compared with diamond turning and ruling, the proposed process will reduce the prototyping cycles from several weeks to several hours, enable new capabilities for rendering voxel-controlled gratings, and reduce form errors by combining free-form surface generation and grating fabrication in a single step.

Examples of capabilities of the grating fabrication process include the following:

Concave and convex lens with superimposed gratings, where at different locations of the lens, the grating spacing may be variable Aspherical lens (freeform optics) with superimposed gratings, where at different locations of the lens, the grating spacing can be variable Fresnel lens (freeform, plane optics) with superimposed gratings, where at different locations of the lens, the grating spacing can be variable Prior multi-step fabrication processes for integrated optical systems were time consuming and expensive, requiring a minimum thickness to include an optical lens, mirror, and integrated gratings on a substrate. The fabrication process described herein may be accomplished in one manufacturing step using direct machining and may also be performed in batches to further reduce the time and cost to complete. In addition, the fabrication process described herein may minimize the required thickness of the integrated optical system according to the Fresnel distance. The Fresnel distance is the minimum distance travelled by a ray of light along a linear path before diffraction.

A radial Fresnel lens may be directly machined on roller molds by rotating-tool diamond turning. A grating may be fabricated with elliptical vibration texturing to obtain an efficiency of about 1,000 to 40,000 gratings per second. In this method, the cutting tool may follow an elliptical trajectory while oriented perpendicular to the cutting direction of a workpiece. A spacing distance d between gratings may be defined as v/f and may be adjustable by a nominal cutting velocity, with a minimal spacing of 300 nm. A grating height may be dependent upon the spacing distance and may typically be about 30 nm to 150 nm independent of the nominal depth of cut (DOC).

Various materials may be adaptable and utilized for fabricating gratings. These may include metals such as aluminum, stainless steel, brass, and copper. The materials may include brittle materials such as silicon, for example, using ductile-mode texturing. The materials may include transparent materials such as polymer.

FIG. 1 illustrates a schematic of an exemplary grating formation mechanism tool path 100 on a workpiece 105 in a scanning mode from a starting point 110 to an end point 120 for fabricating a grating. The tool path 100 includes a sequence of horizontal forward tool paths 130 that run parallel to an axis x and a sequence of angled return tool paths 140 that each return from the end of a corresponding horizontal forward tool path 130 along an angle relative to the corresponding horizontal forward tool path 130 to begin a new horizontal forward tool path 130 adjacent to the corresponding horizontal forward tool path 130. A cutting tool may cut grooves within the workpiece 105 along the horizontal forward tool paths 130 to form Fresnel teeth between the horizontal forward tool paths 130. The cutting tool may be raised above a surface of the workpiece 105 when following the angled return tool paths 140 to avoid cutting the workpiece 105. The horizontal forward tool paths 130 may be parallel to one or more other horizontal forward tool paths 130. The horizontal forward tool paths 130 may be set at one or more distances from each other along a y axis to define one or more distances between Fresnel teeth of the fabricated grating on the workpiece 105. The angled return tool paths 140 may be parallel to one or more other angled return tool paths 140. The angled return tool paths 140 may take different paths at different angles between different horizontal forward tool paths 130 without impacting the fabricated grating on the workpiece 105 at least because the cutting tool may not cut or touch the surface of the workpiece 105 when returning from an end of one horizontal forward tool path 130 to a beginning of another horizontal forward tool path 130.

The fabricated grating on the workpiece 105 may include N Fresnel teeth formed between the horizontal forward tool paths 130, with a height $h_n$ of the $n^{th}$ Fresnel tooth defined according to Eq. 1:

$$\frac{h_n}{l_n} = \frac{1}{2}\tan\left(\arctan\left(\frac{|x_n|}{f - l_n/2}\right)\right), \tag{1}$$

and a z-axis path within the $n^{th}$ Fresnel tooth defined according to Eq. 2:

$$z(x) = h_n\frac{|x - x_n|}{l_n}, \tag{2}$$

where $h_n$ is a height of the $n^{th}$ Fresnel tooth, $l_n$ is a length of the $n^{th}$ Fresnel tooth, f is a desired focus length of the grating, $x_n$ is a starting x coordinate of the $n^{th}$ Fresnel tooth, x is a real-time x coordinate of the cutting tool, and $z_n$ is a z axis coordinate during processing of the $n^{th}$ Fresnel tooth.

Figure 2:
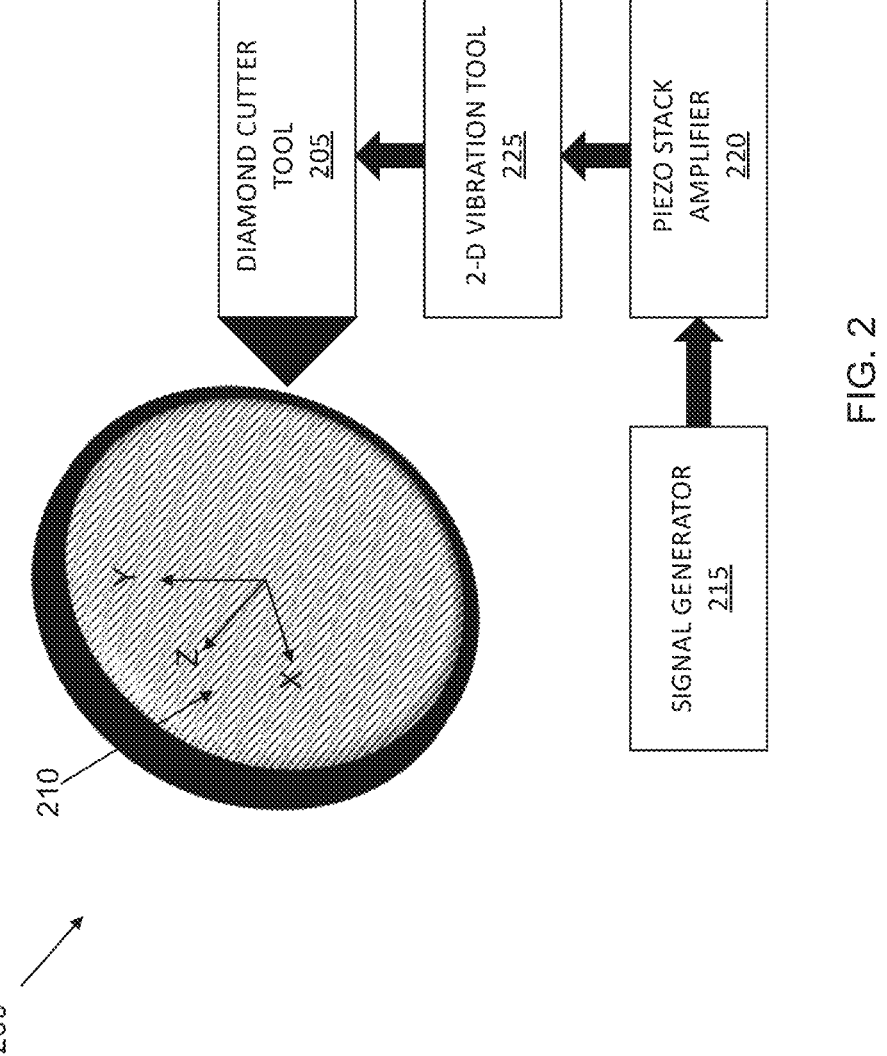
FIG. 2 illustrates a schematic of an exemplary grating fabrication system for grating fabrication in scanning mode.

FIG. 2 illustrates a schematic of an exemplary grating fabrication system 200 for grating fabrication in scanning mode. The grating fabrication system 200 may machine a freeform structure in a same step as fabricating a grating on the freeform structure. The grating fabrication system 200 may include a diamond cutter tool 205 arranged and configured to cut gratings into a workpiece 210 along a Y direction with a depth of cut (DOC) along a Z direction with feed in an X direction. A signal generator 215 may provide a signal for controlling operation of the diamond cutter tool 205 to a piezo stack amplifier 220. The piezo stack amplifier 220 may include a PiezoDrive PX200 amplifier, for example. The piezo stack amplifier 220 may control a 2-D vibration tool 225 that in turn controls cutting of the diamond cutter tool 205. A ratio of the DOC to cutting distance along the Y direction may be greater than 1, for example, 3:1. The diamond cutter tool 205 may rotate along an elliptical path relative to the workpiece 210 while performing cutting of the workpiece 210.

Figure 3:
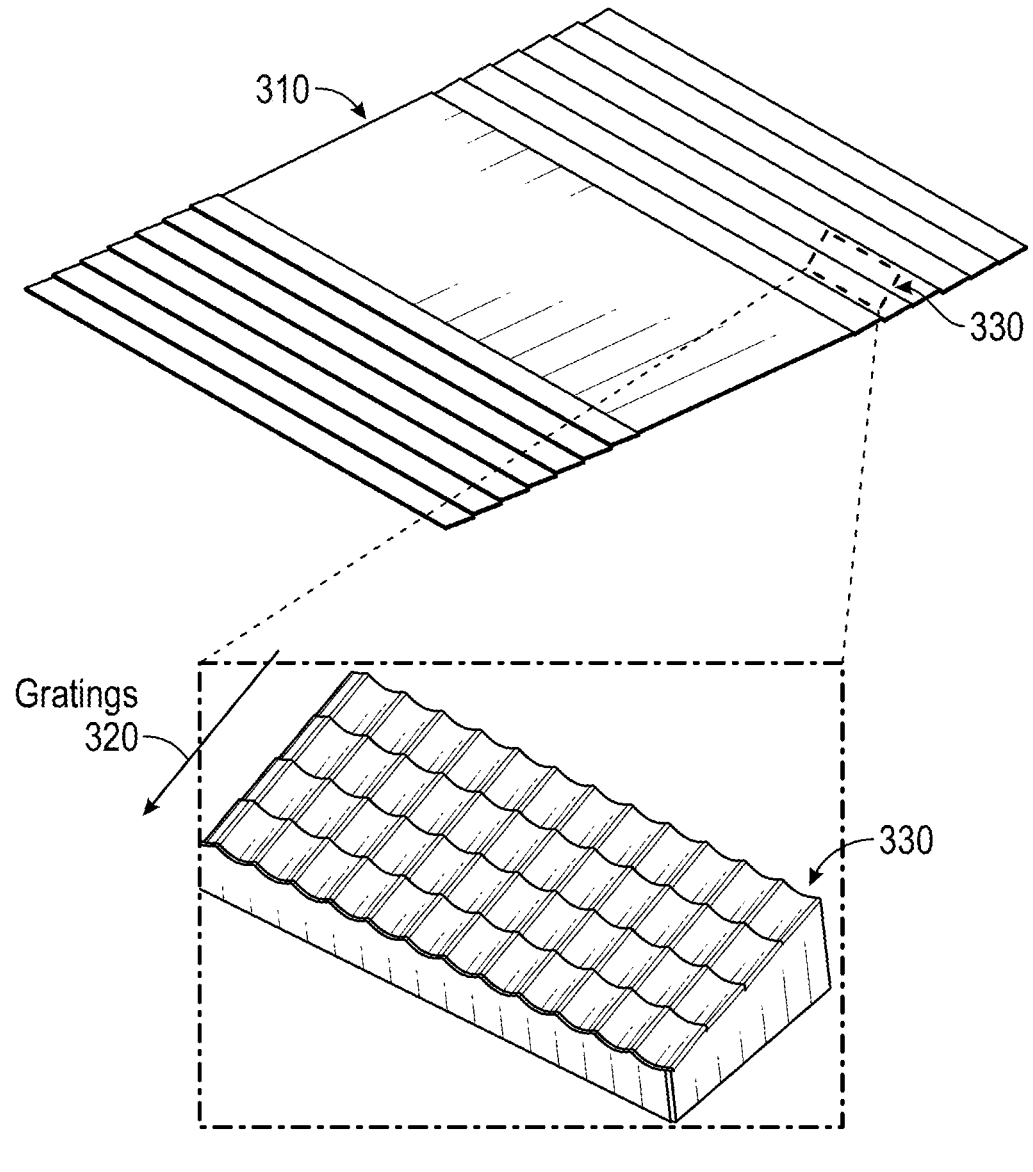
FIG. 3 illustrates a Fresnel mirror fabricated using the grating fabrication system of FIG. 2, and a detailed view of gratings in a grating arrangement within the Fresnel mirror.

FIG. 3 illustrates a Fresnel mirror 310 fabricated using the grating fabrication system 200, and a detailed view of gratings 320 in a grating arrangement 330 within the Fresnel mirror 310.

Figure 4A:
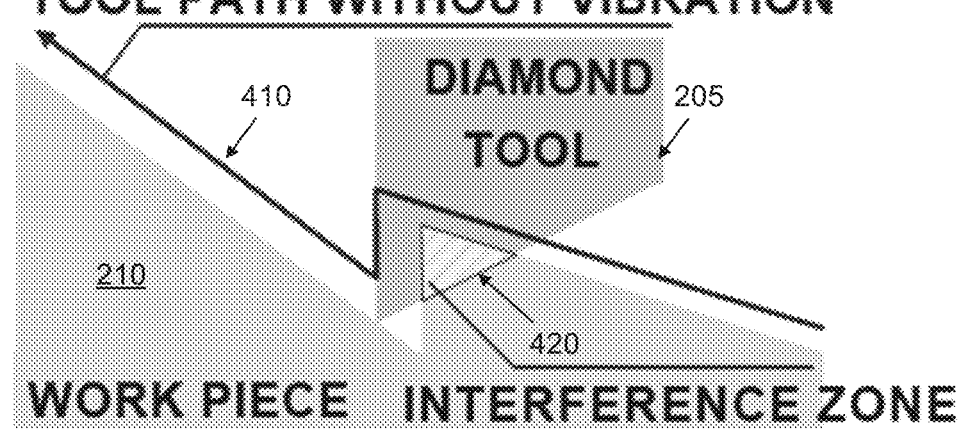
FIG. 4A illustrates an exemplary initial tool path of the diamond cutter tool intersecting with an interference zone of the workpiece.
Figure 4B:
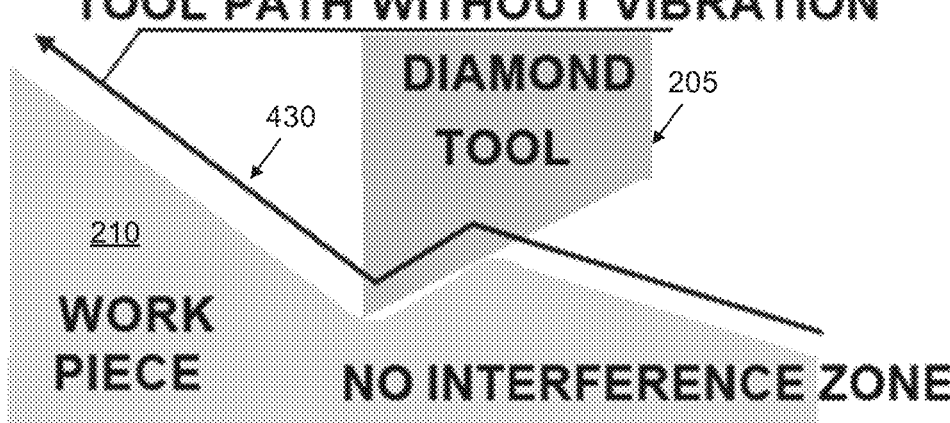
FIG. 4B illustrates an exemplary smoothed tool path of the diamond cutter tool without an interference zone of the workpiece.

FIG. 4A illustrates an exemplary initial tool path 410 of the diamond cutter tool 205 intersecting with an interference zone 420 of the workpiece 210. FIG. 4B illustrates an exemplary smoothed tool path 430 of the diamond cutter tool 205 without an interference zone of the workpiece 210. The initial tool path 410 and the smoothed tool path 430 are shown without vibration.

Figure 5:
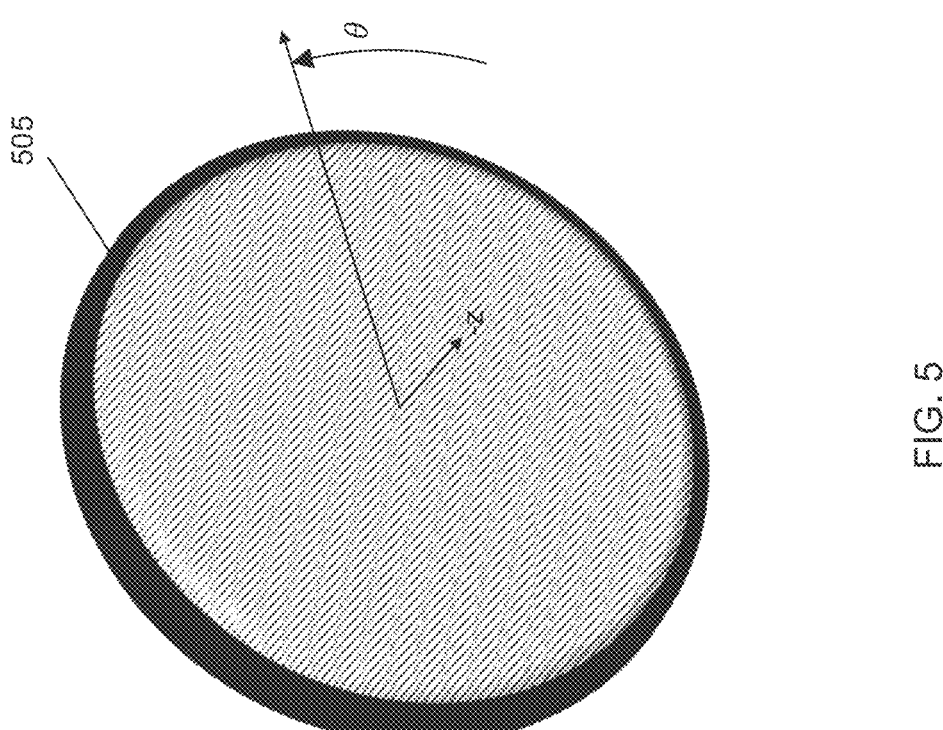
FIG. 5 illustrates a schematic of an exemplary workpiece with coordinates defined for planning an exemplary grating formation mechanism tool path in a turning mode for fabricating a grating.

FIG. 5 illustrates a schematic of an exemplary workpiece 505 with coordinates defined for planning an exemplary grating formation mechanism tool path in a turning mode for fabricating a grating. The fabricated grating on the workpiece 505 may include N Fresnel teeth formed between the maximum radius $r_N$ and the minimum radius $r_1$ from the center axis about which the workpiece 505 turns. A height $h_n$ of the $n^{th}$ Fresnel tooth may be defined according to Eq. 3:

$$\frac{h_n}{l_n} = \frac{1}{2}\tan\left(\arctan\left(\frac{r_n}{f - l_n/2}\right)\right), \tag{3}$$

and a z-axis path within the $n^{th}$ Fresnel tooth defined according to Equation 4:

$$z_n(r) = h_n\frac{r - r_n}{l_n}, \tag{4}$$

And an overall path of a spindle defined according to Equation 5:

$$\theta r_1 - \frac{\theta^2}{4\pi}\Delta r = Vt, \tag{5}$$

where $h_n$ is a height of the $n^{th}$ Fresnel tooth, $l_n$ is a length of the $n^{th}$ Fresnel tooth, f is a desired focus length of the grating, $r_n$ is a starting radius of the $n^{th}$ Fresnel tooth, r is a real-time radius of the cutting tool, $z_n$ is a z axis coordinate during processing of the $n^{th}$ Fresnel tooth, $\theta$ is the angle of the spindle, V is the constant speed, and $\Delta r$ is the cross feed on the x-axis.

Figure 6:
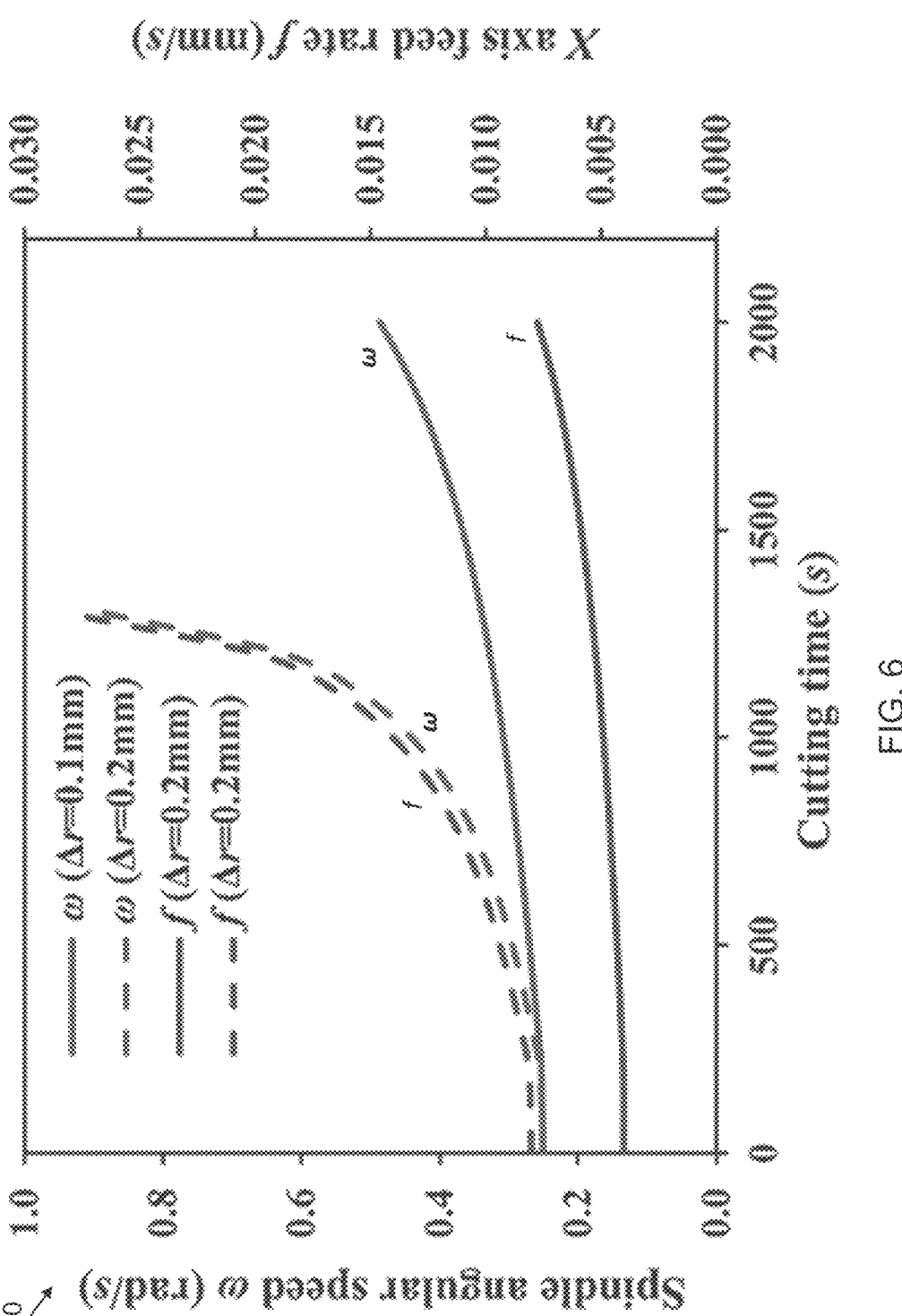
FIG. 6 illustrates a plot of rotation speed and x-axis feed rate over cutting time for different values of $\Delta r$ in an experimental demonstration of cutting the exemplary workpiece of FIG. 5 using the exemplary grating formation mechanism tool path in a turning mode for fabricating a grating.

FIG. 6 illustrates a plot 600 of rotation speed and x-axis feed rate over cutting time for different values of $\Delta r$ in an experimental demonstration of cutting the exemplary workpiece 505 using the exemplary grating formation mechanism tool path in a turning mode for fabricating a grating. In the plot 600, the cutting time along the plot's x-axis is shown with retraction time excluded. In the experiment that produced the results of plot 600, the $l_n$ for all Fresnel teeth were 1 mm, the f were all 100 mm, the $r_N$ was 100 mm, and the V was 6 mm/s.

Figure 7:
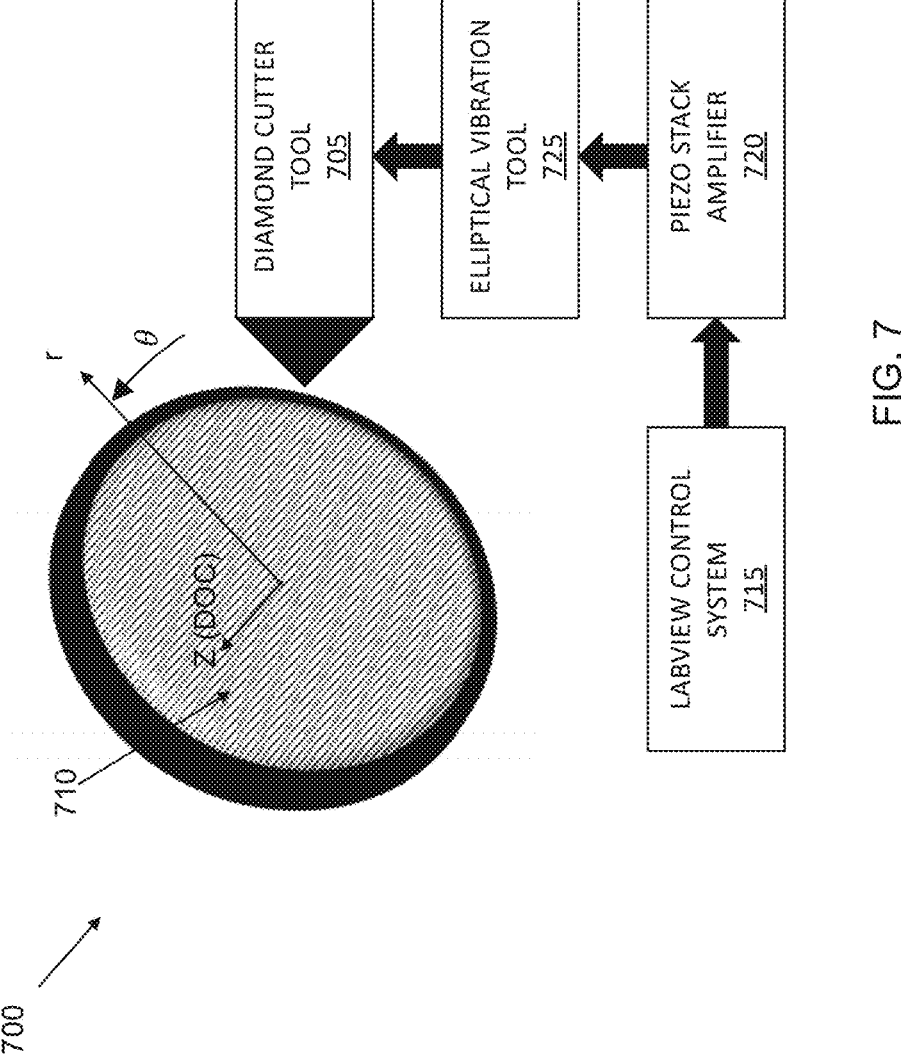
FIG. 7 illustrates a schematic of an exemplary grating fabrication system for grating fabrication in turning mode.

FIG. 7 illustrates a schematic of an exemplary grating fabrication system 700 for grating fabrication in turning mode. The grating fabrication system 700 may include a diamond cutter tool 705 arranged and configured to cut gratings into a workpiece 710 along an angular $\theta$ direction with a depth of cut (DOC) along a z direction with feed in an r direction. A LabView control system 715 may provide a signal for controlling operation of the diamond cutter tool 705 to a piezo stack amplifier 720. The piezo stack amplifier

720 may include a PiezoDrive PX200 amplifier, for example. The piezo stack amplifier 720 may control an elliptical vibration tool 725 that in turn controls cutting of the diamond cutter tool 705.

FIG. 8 illustrates a trajectory of the diamond cutter tool 705 along the X-axis and the depth of cut (CUT) on the Z-axis.

Figure 9:
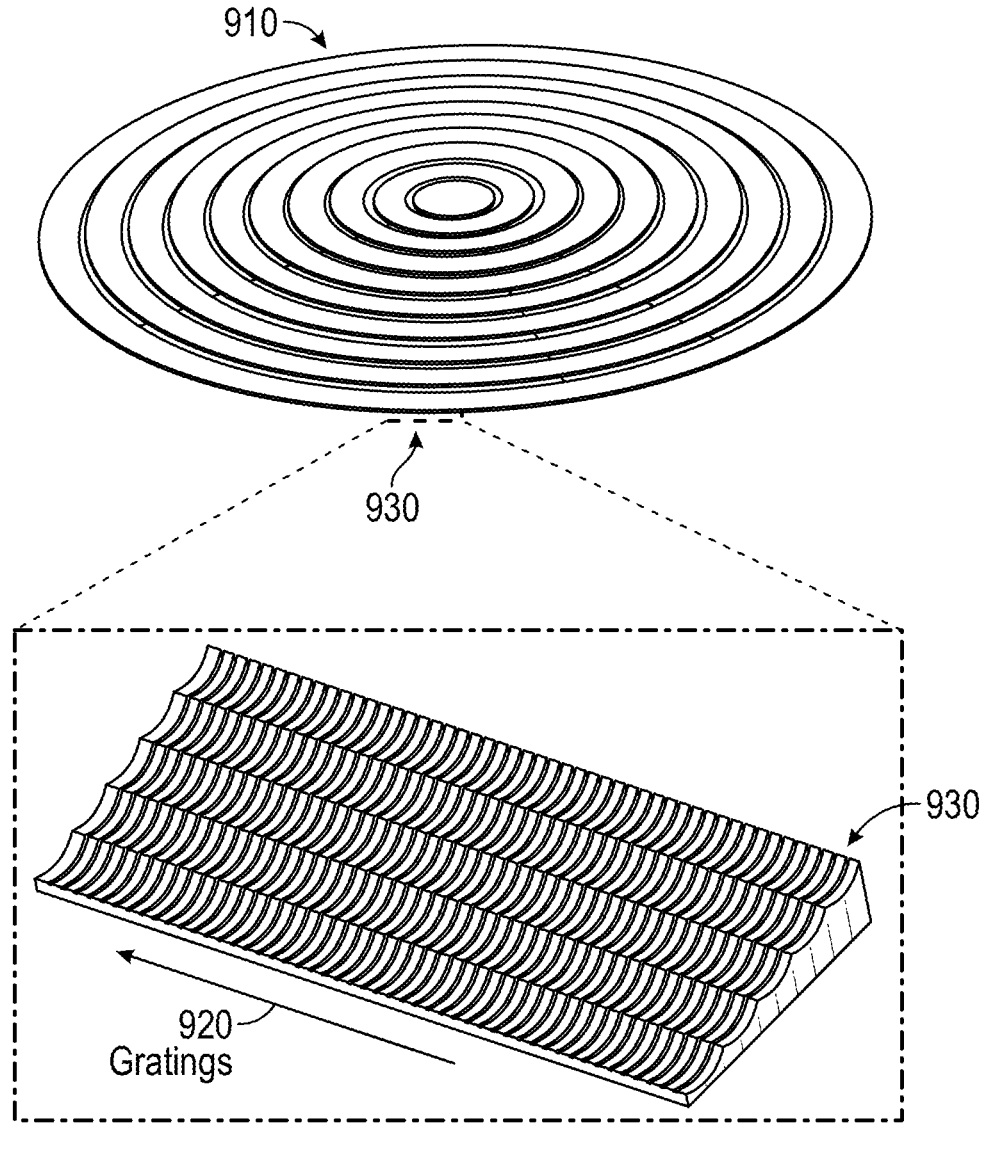
FIG. 9 illustrates a Fresnel mirror fabricated using the grating fabrication system of FIG. 7, and a detailed view of gratings in a grating arrangement within the Fresnel mirror.

FIG. 9 illustrates a Fresnel mirror 910 fabricated using the grating fabrication system 700, and a detailed view of gratings 920 in a grating arrangement 930 within the Fresnel mirror 910.

Figures 10A, 10B:
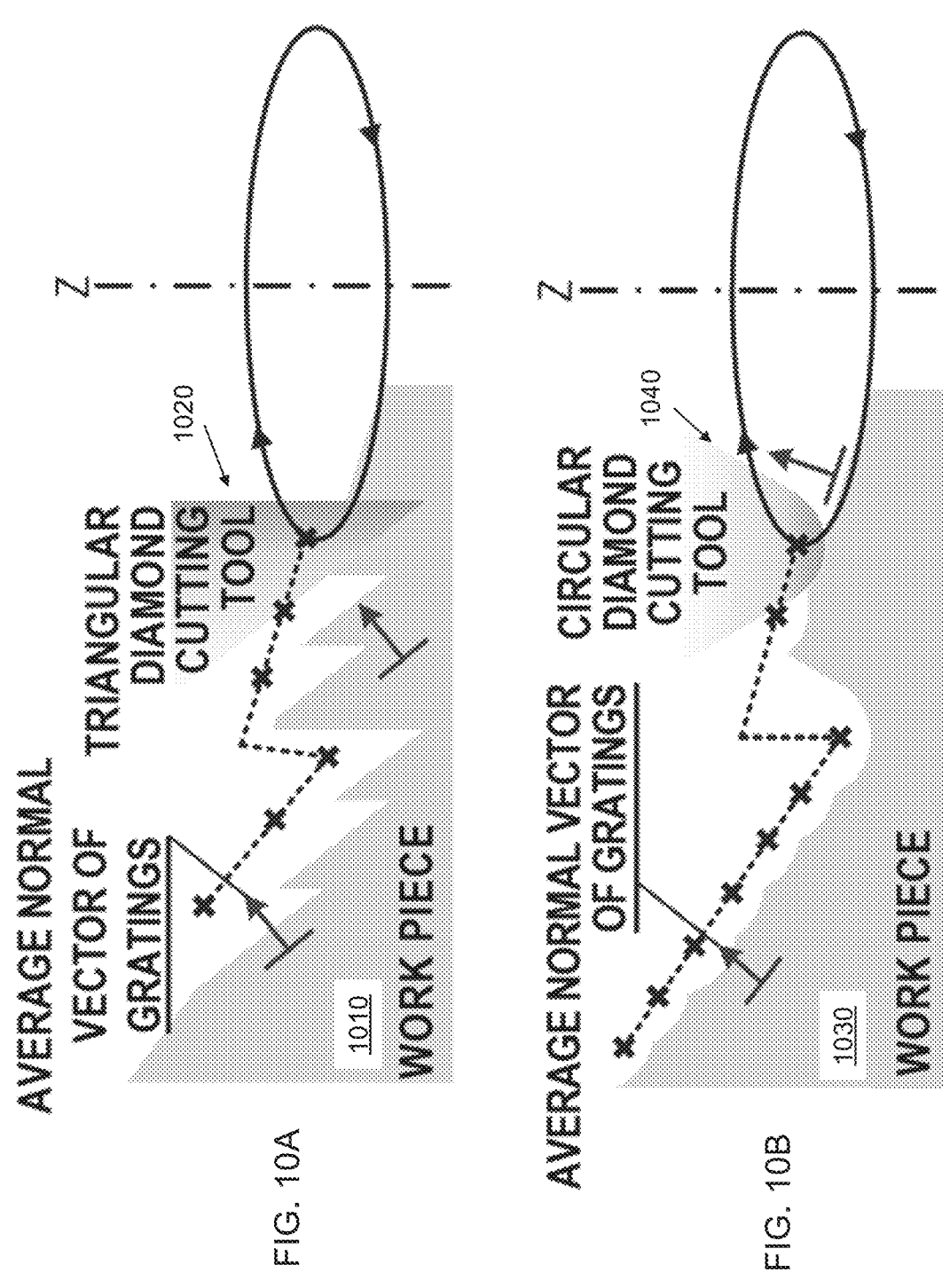
FIG. 10A illustrates an exemplary workpiece resulting from cutting with a triangular diamond cutting tool.
FIG. 10B illustrates an exemplary workpiece resulting from cutting with a circular diamond cutting tool.

FIG. 10A illustrates an exemplary workpiece 1010 resulting from cutting with a triangular diamond cutting tool 1020. FIG. 10B illustrates an exemplary workpiece 1030 resulting from cutting with a circular diamond cutting tool 1040. The workpiece 1030 shows that the normal vector of the gratings is the same as that of the corresponding segment when cut with the circular diamond cutting tool 1040.

Figure 11:
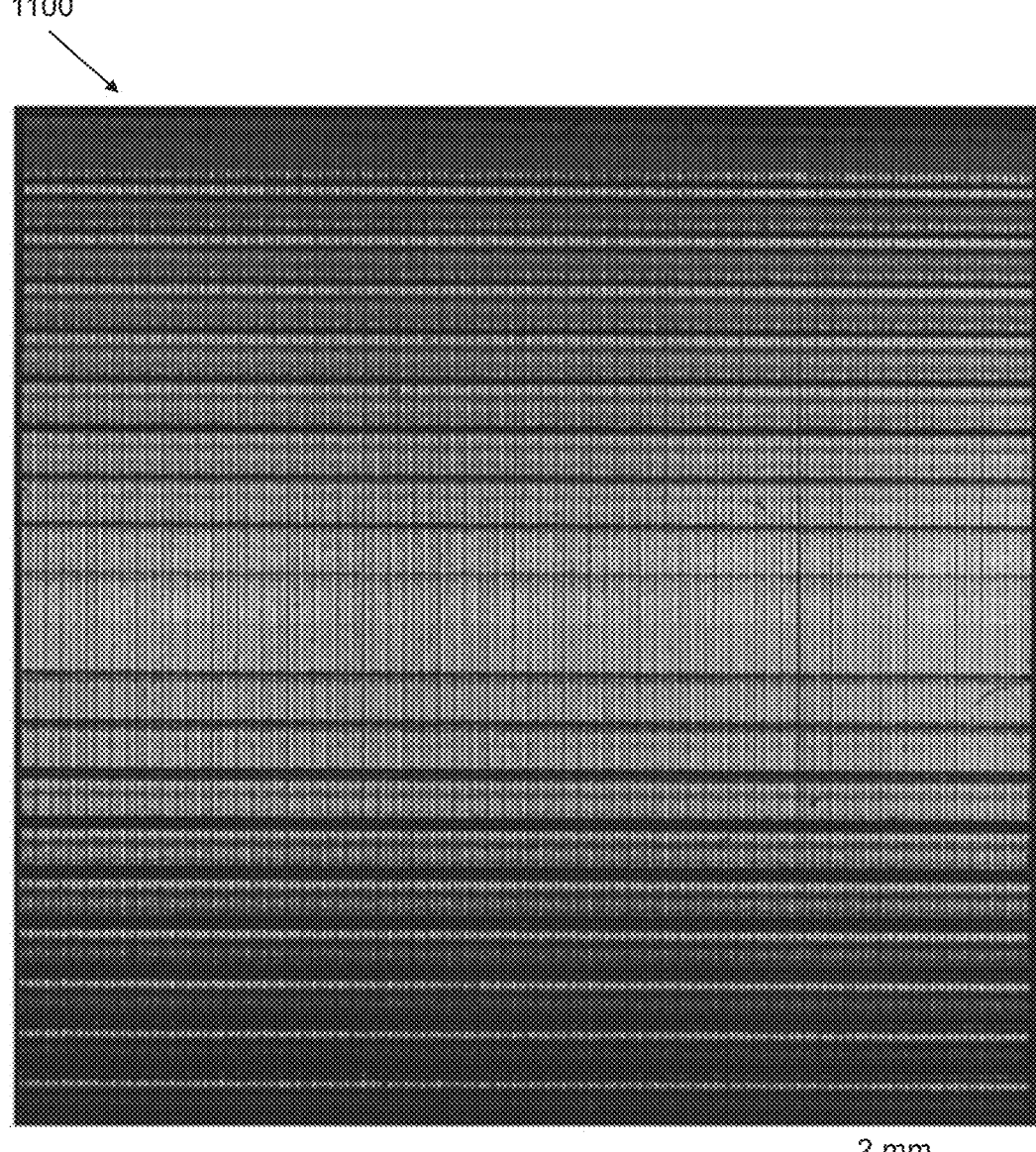
FIG. 11 illustrates an exemplary cylindrical Fresnel lens resulting from grating fabrication in scanning mode.

FIG. 11 illustrates an exemplary cylindrical Fresnel lens 1100 resulting from grating fabrication in scanning mode.

Figure 12:
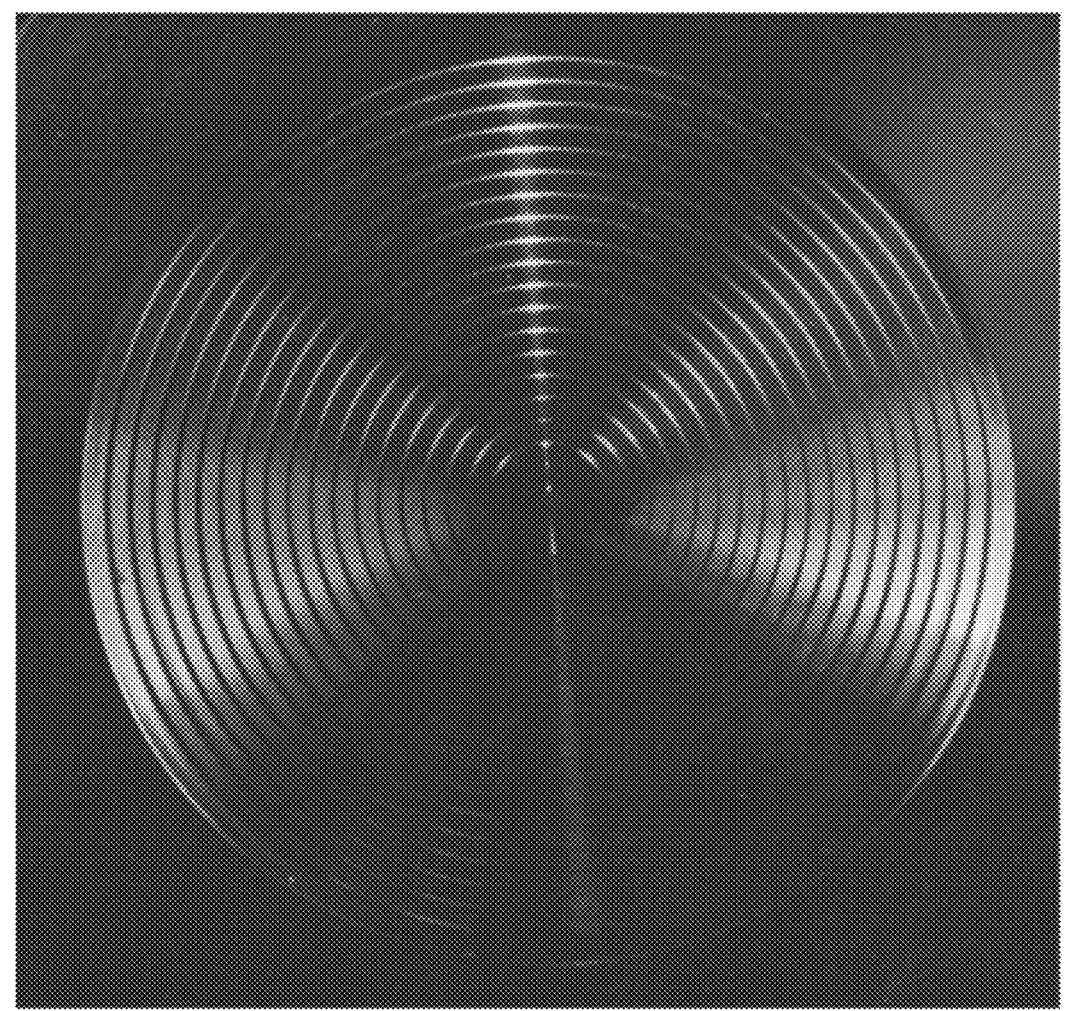
FIG. 12 illustrates an exemplary circular Fresnel lens resulting from grating fabrication in turning mode.

FIG. 12 illustrates an exemplary circular Fresnel lens 1200 resulting from grating fabrication in turning mode.

Figure 13A:
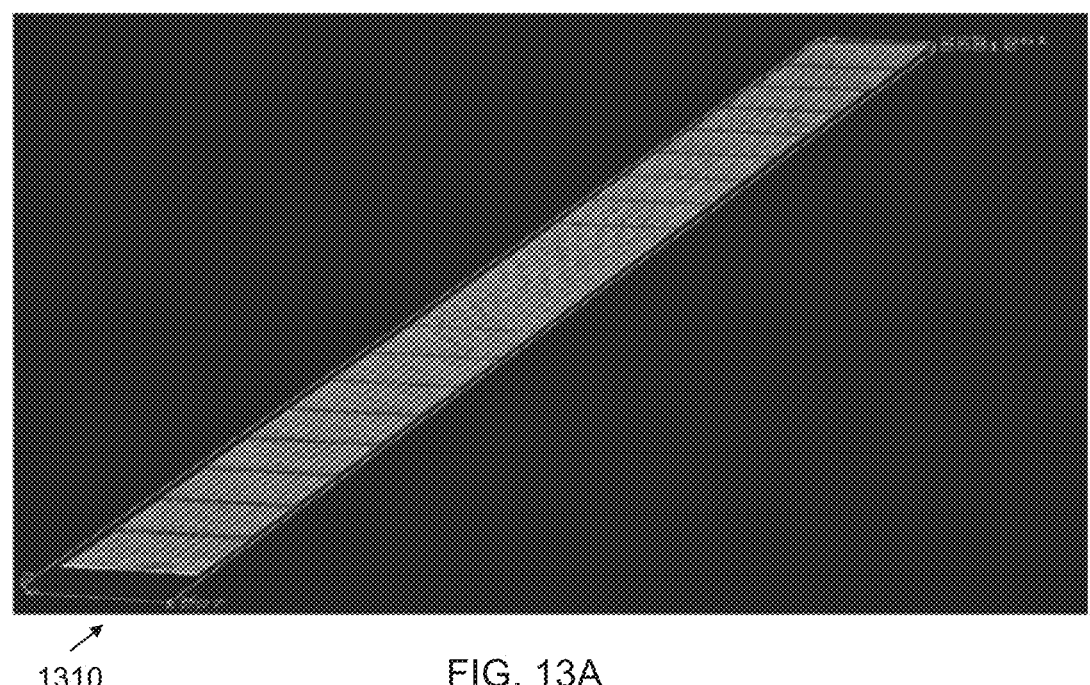
FIG. 13A illustrates an image of an exemplary grating resulting from grating fabrication in turning mode, magnified at 5×.

FIG. 13A illustrates an image of an exemplary grating 1310 resulting from grating fabrication in turning mode, magnified at 5×.

Figure 13B:
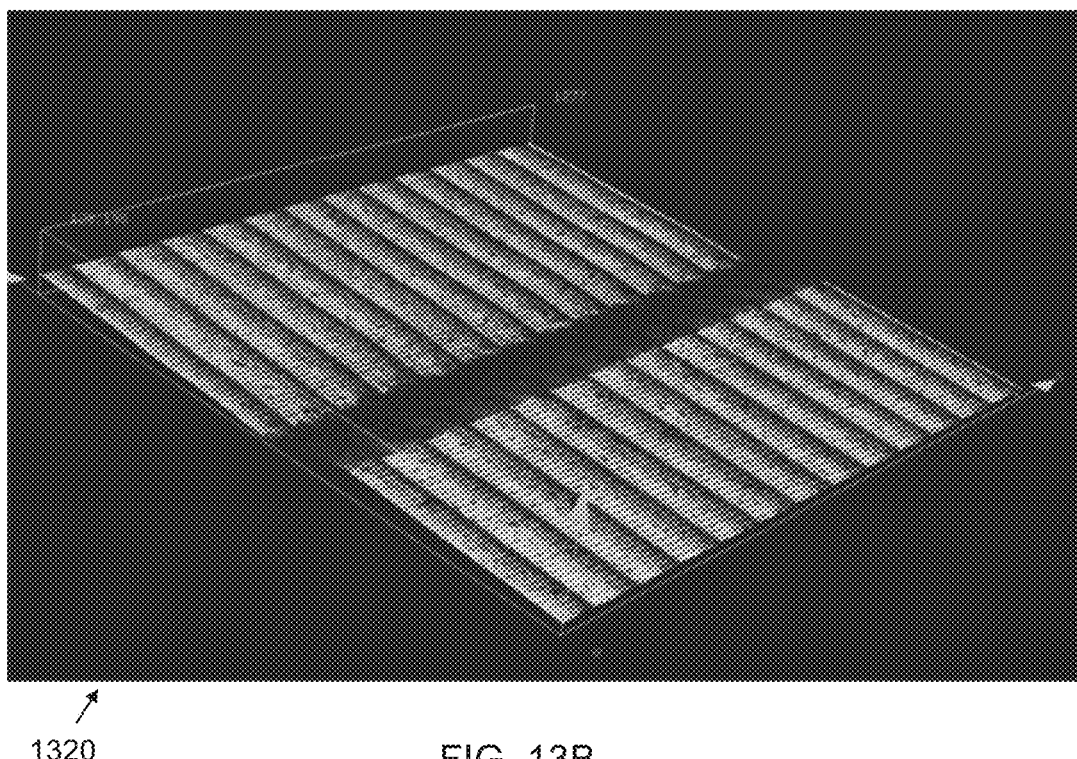
FIG. 13B illustrates an image of an exemplary grating resulting from grating fabrication in turning mode, magnified at 20×.

FIG. 13B illustrates an image of an exemplary grating 1320 resulting from grating fabrication in turning mode, magnified at 20×.

Figure 13C:
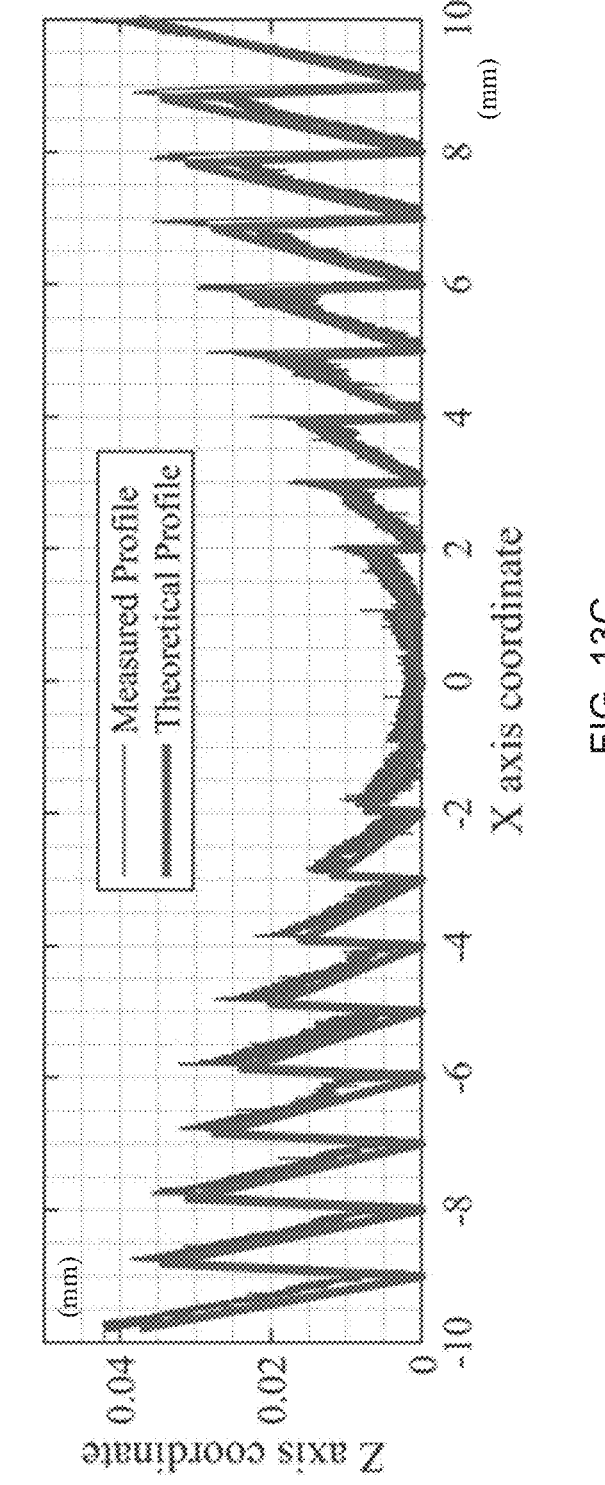
FIG. 13C illustrates a plot of a measured z-axis profile and a theoretical z-axis profile vs x-axis of an exemplary circular Fresnel lens.

FIG. 13C illustrates a plot 1330 of a measured z-axis profile and a theoretical z-axis profile vs x-axis of an exemplary circular Fresnel lens. The exemplary circular Fresnel lens associated with the plot 1330 may have been fabricated with high-frequency gratings using turning mode as discussed above.

Figure 13D:
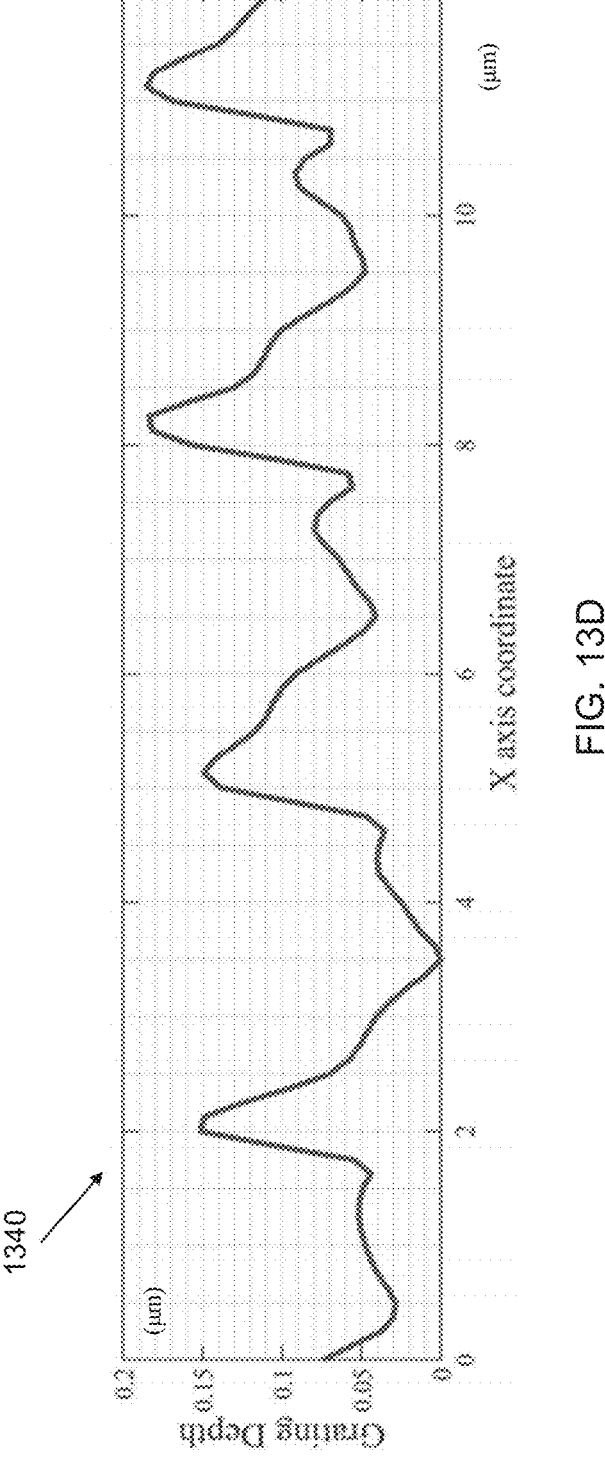
FIG. 13D illustrates a zoomed-in plot of a measured grating depth vs x-axis of an exemplary circular Fresnel lens.

FIG. 13D illustrates a zoomed-in plot 1340 of a measured grating depth vs x-axis of an exemplary circular Fresnel lens. The exemplary circular Fresnel lens associated with the plot 1340 may have been fabricated with high-frequency gratings using turning mode as discussed above.

Figure 14A:
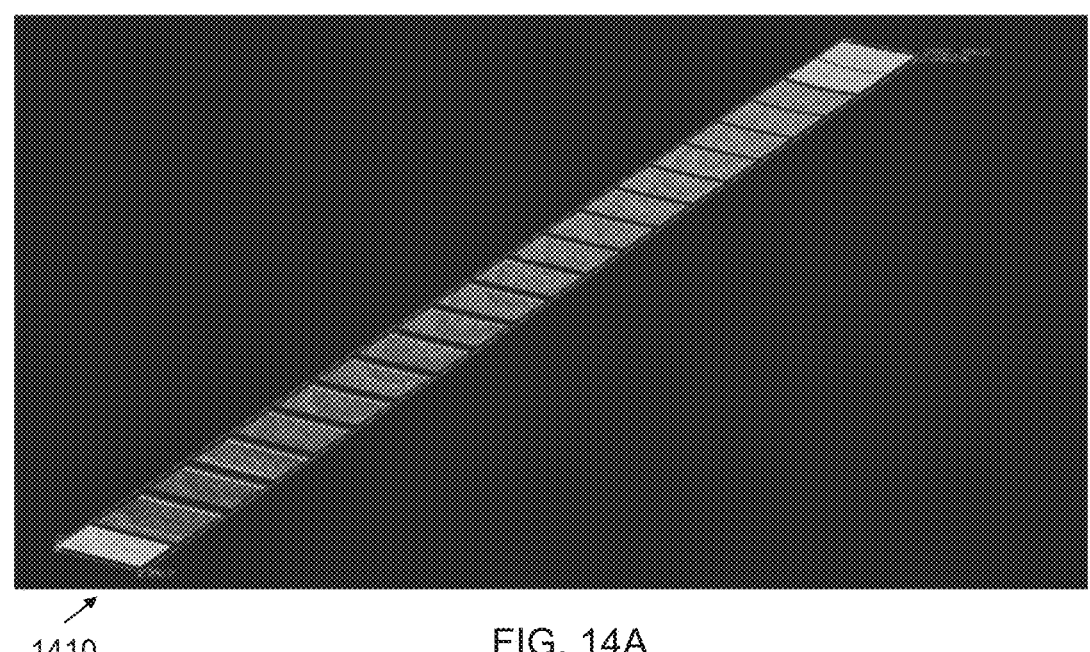
FIG. 14A illustrates an image of an exemplary grating resulting from grating fabrication in turning mode, magnified at 10×.

FIG. 14A illustrates an image of an exemplary grating 1410 resulting from grating fabrication in turning mode, magnified at 10×.

Figure 14B:
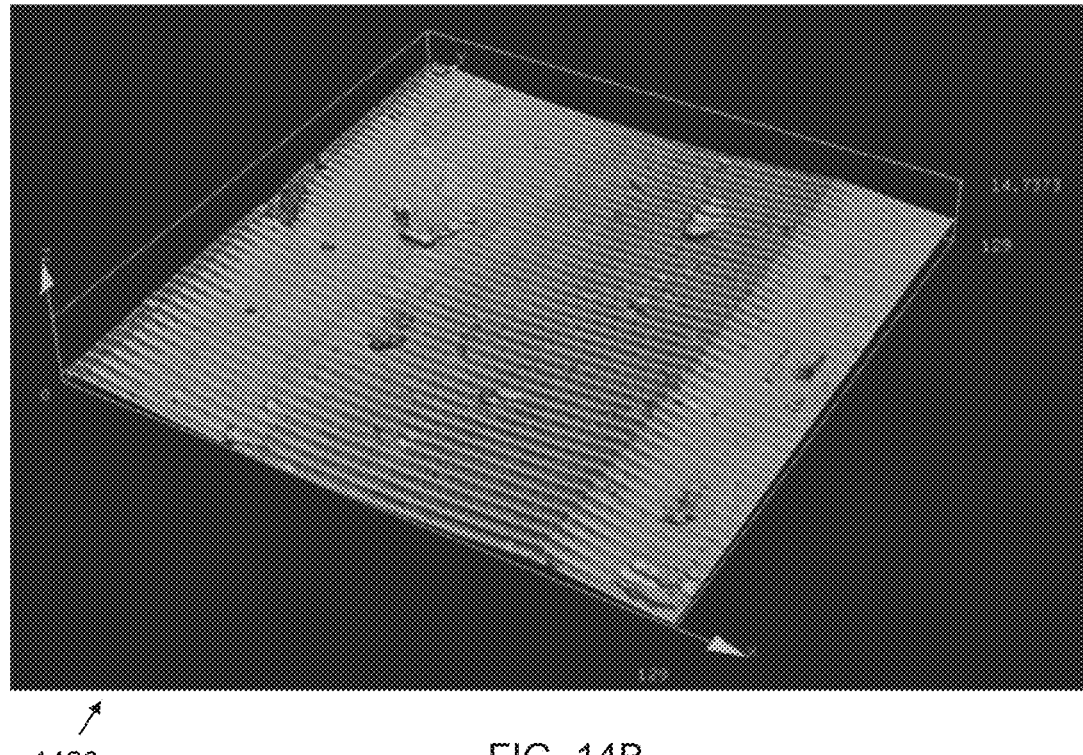
FIG. 14B illustrates an image of an exemplary grating resulting from grating fabrication in turning mode, magnified at 100×.

FIG. 14B illustrates an image of an exemplary grating 1420 resulting from grating fabrication in turning mode, magnified at 100×.

Figure 14C:
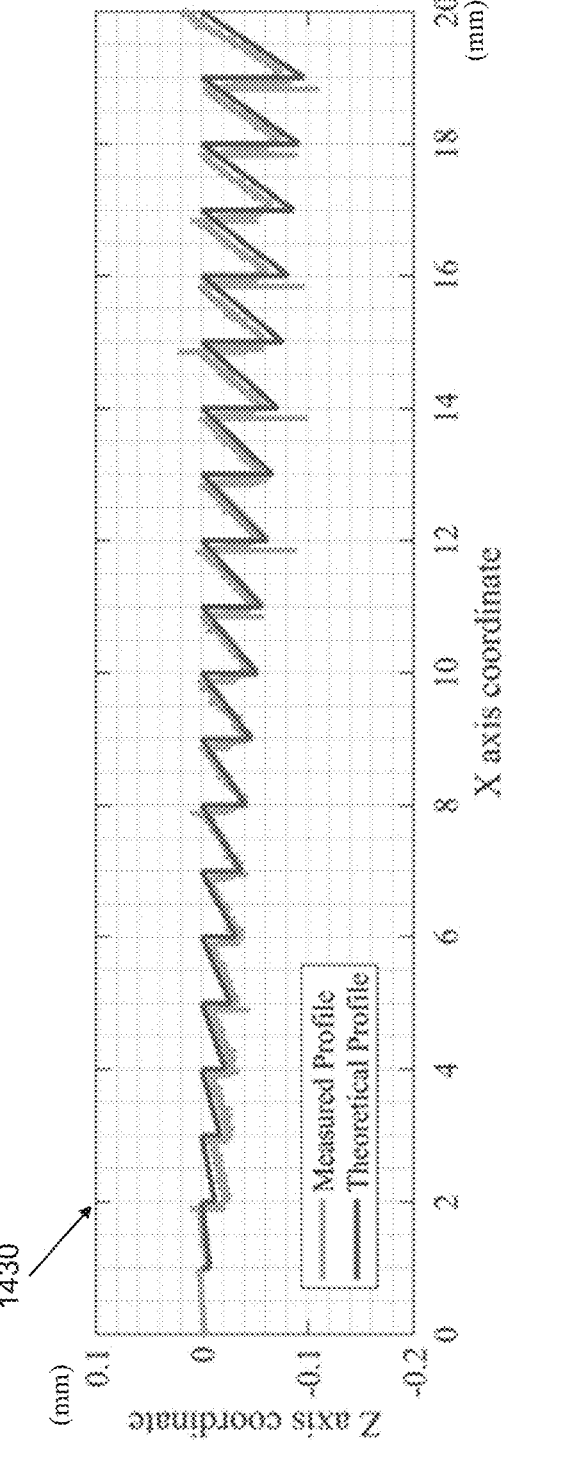
FIG. 14C illustrates a plot of a measured z-axis profile and a theoretical z-axis profile vs x-axis of an exemplary cylindrical Fresnel lens.

FIG. 14C illustrates a plot 1430 of a measured z-axis profile and a theoretical z-axis profile vs x-axis of an exemplary cylindrical Fresnel lens. The exemplary circular Fresnel lens associated with the plot 1430 may have been fabricated using turning mode as discussed above.

Figure 14D:
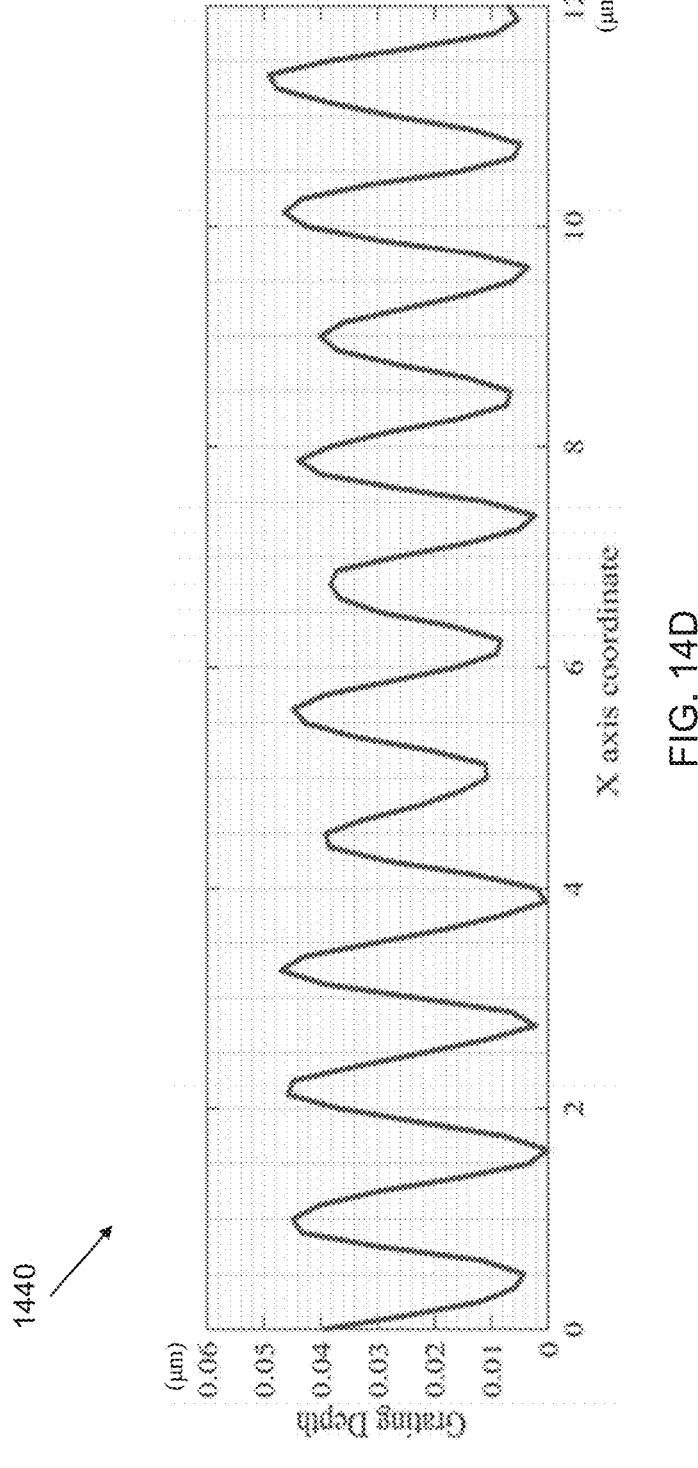
FIG. 14D illustrates a zoomed-in plot of a measured grating depth vs x-axis of an exemplary circular Fresnel lens.

FIG. 14D illustrates a zoomed-in plot 1440 of a measured grating depth vs x-axis of an exemplary circular Fresnel lens. The exemplary circular Fresnel lens associated with the plot 1440 may have been fabricated with high-frequency gratings using turning mode as discussed above.

Figure 15:
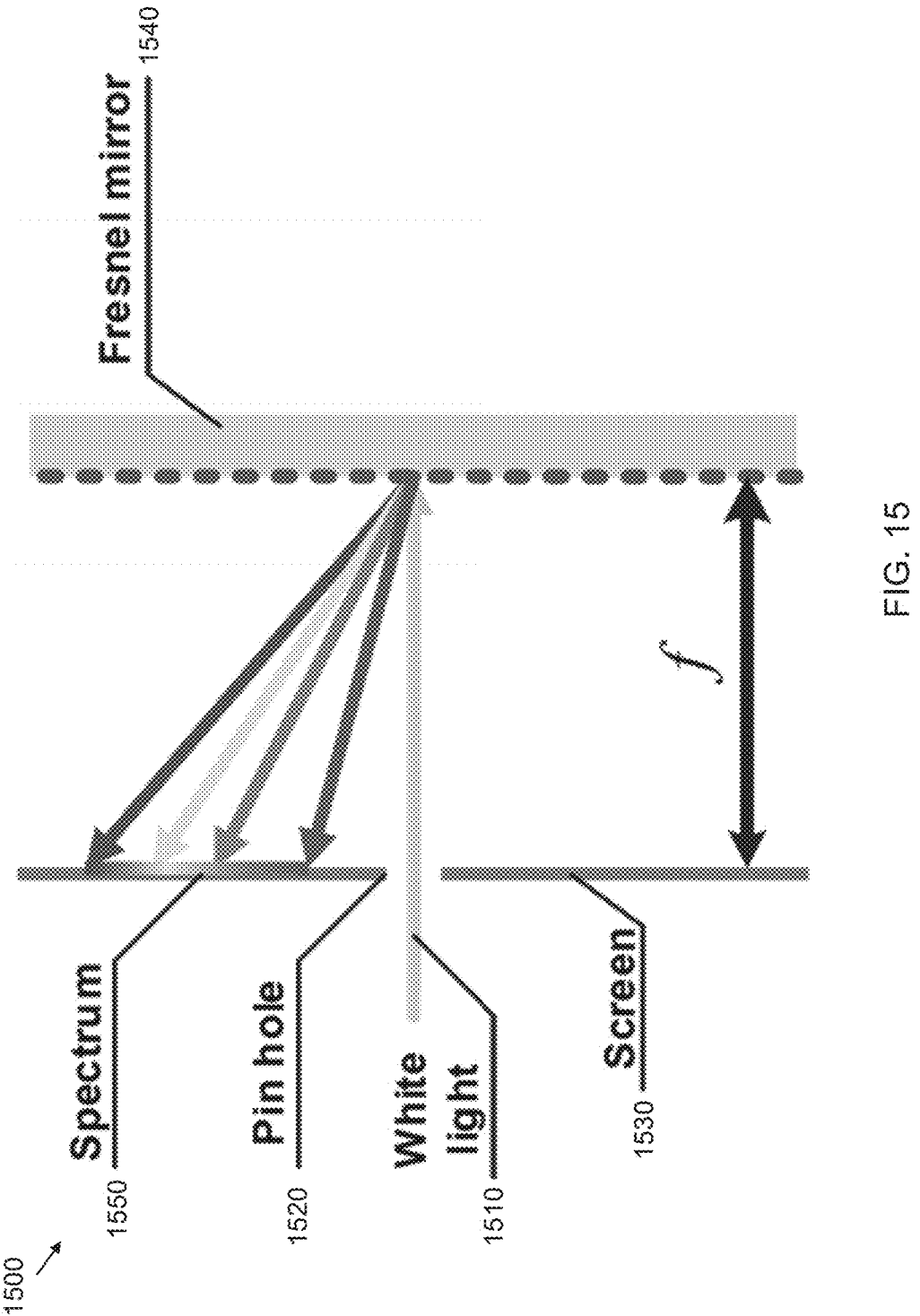
FIG. 15 illustrates a schematic of an exemplary experimental setup for validation of optical properties of a Fresnel mirror.

FIG. 15 illustrates a schematic of an exemplary experimental setup 1500 for validation of optical properties of a Fresnel mirror. White light 1510 may be projected from a white light source, e.g., a fiber light source, through a pin hole 1520 in a screen 1530 toward a Fresnel mirror 1540. The Fresnel mirror may be positioned a focal length f away from the screen 1530. When the white light 1510 reaches the Fresnel mirror 1540, the white light 1510 may be dispersed into a spectrum 1550 of its constituent colors, or separated into separate color components, while reflected back toward the screen 1530. The spectrum 1550 may be visibly displayed on the screen 1530 with longer wavelength colors such as red further from the pin hole 1520 than shorter wavelength colors such as blue.

Figure 16A:
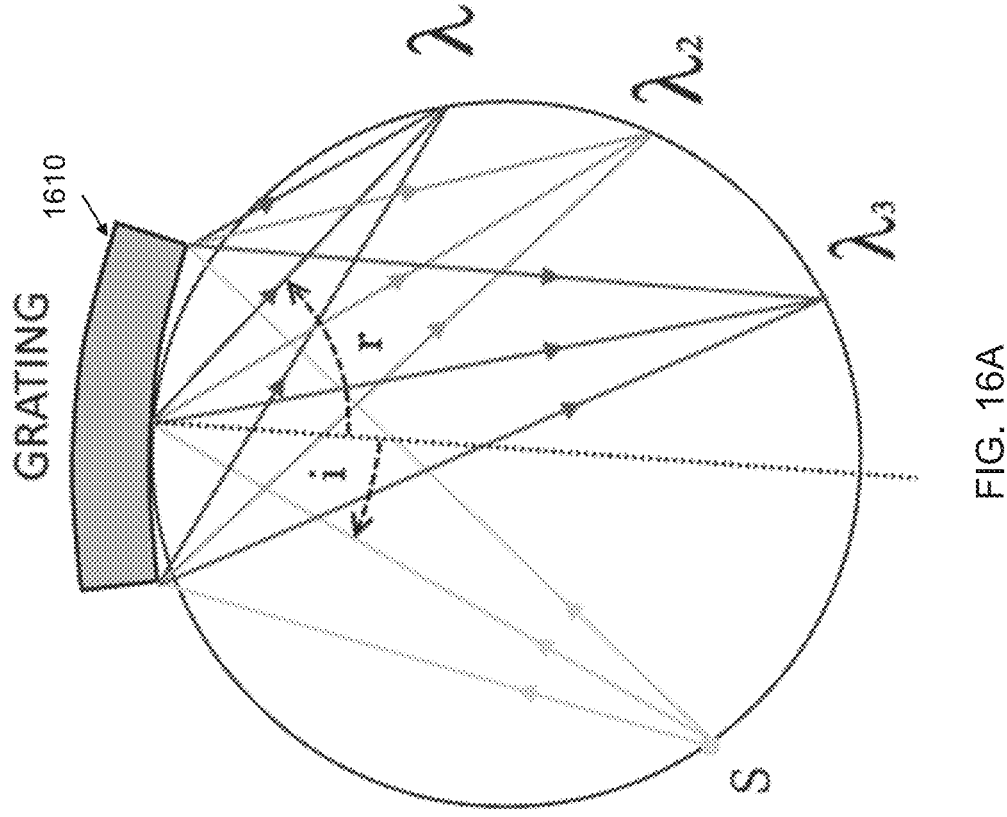
FIG. 16A illustrates a diagram of an exemplary experimental setup for validation of optical properties of a grating.

FIG. 16A illustrates a diagram of an exemplary experimental setup 1600 for validation of optical properties of a grating 1610. The setup 1600 defines an incident angle i of light from an optical source S and a return angle r of light of a specific wavelength $\lambda_n$. When incident light from the optical source S strikes the grating 1610 at an incident angle i=0 degrees, and the incident light includes light having multiple different wavelengths $\lambda_n$ where n ranges from 1 to the number of wavelengths N, Eqs. 6 and 7 may describe optical properties of the grating 1610:

$$m\lambda_n d \sin(\gamma_n), \tag{6}$$

$$\gamma_n a \sin(m\lambda_n/d) \tag{7}$$

Figure 16B:
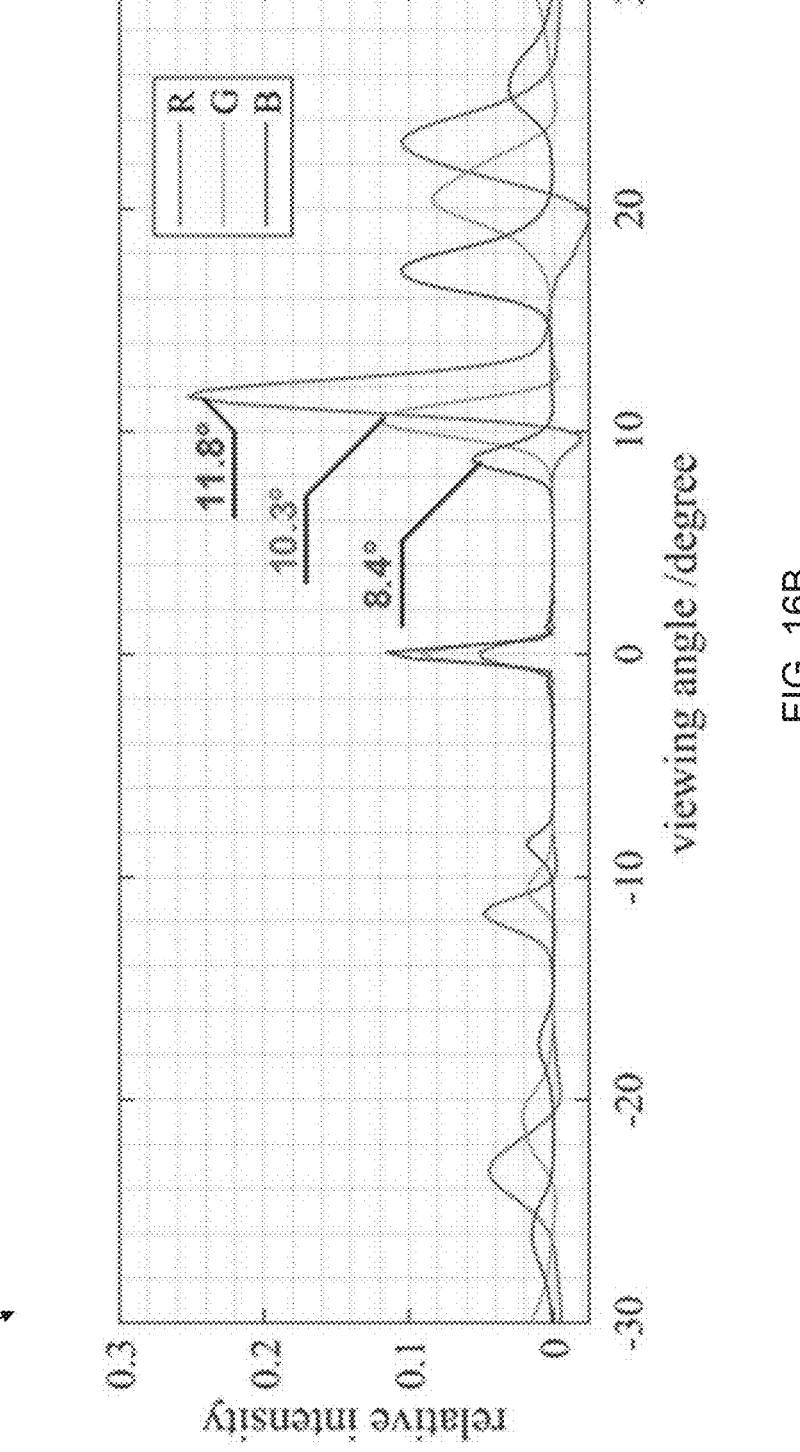
FIG. 16B illustrates a plot of exemplary simulation results for the experimental setup of relative intensity vs viewing angle of three different wavelengths of light $\lambda_n$ according to the exemplary experimental setup of FIG. 16A.

FIG. 16B illustrates a plot of exemplary simulation results 1620 for the experimental setup 1600 of relative intensity vs viewing angle of three different wavelengths of light $\lambda_n$ according to the exemplary experimental setup 1600 of FIG. 16A. The three wavelengths of light simulated were for red ($\lambda_3$), green ($\lambda_2$), and blue ($\lambda_1$). The simulation results 1600 show that blue has a viewing angle of 8.4 degrees, green has a viewing angle of 10.3 degrees, and red has a viewing angle of 11.8 degrees.

Figure 16C:
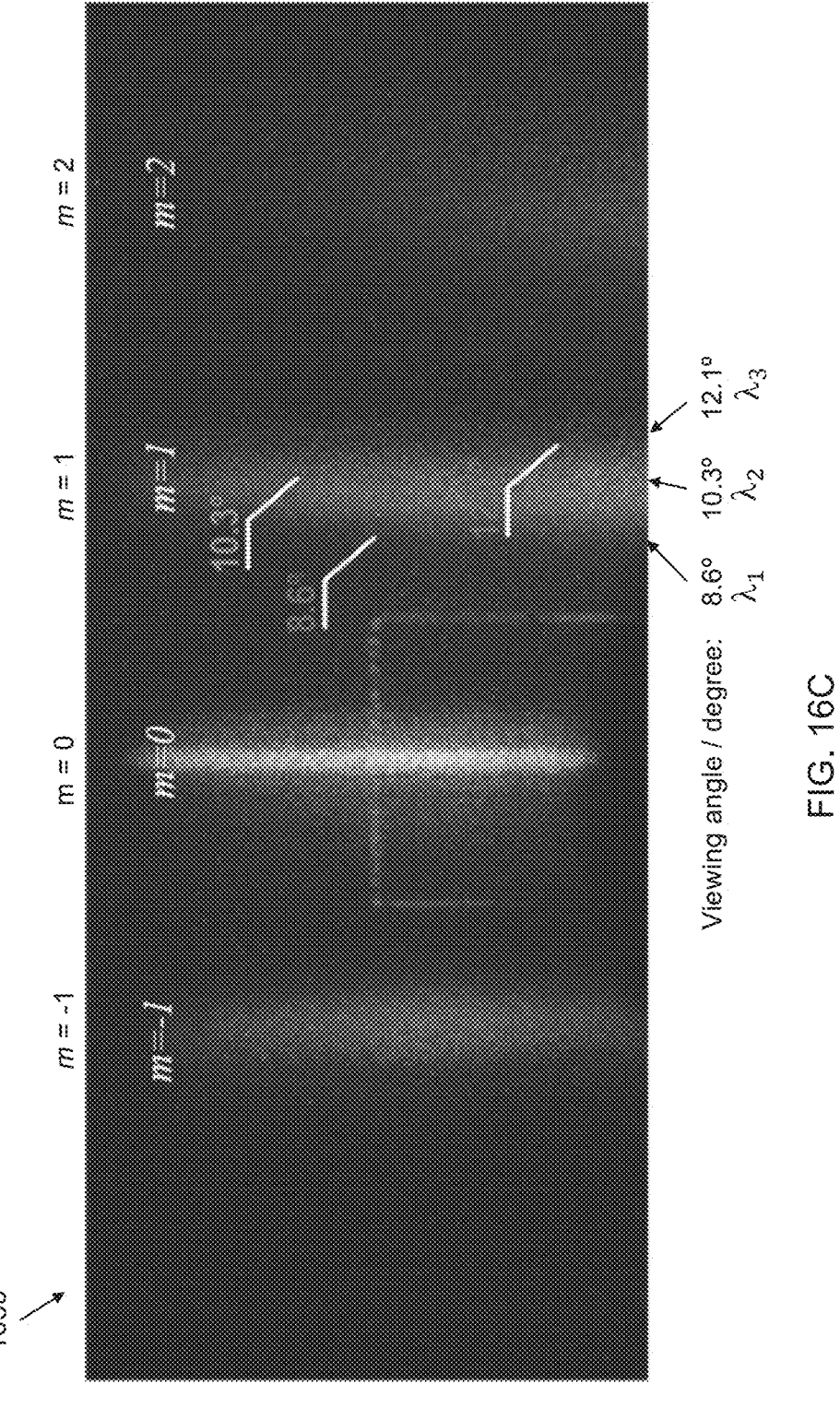
FIG. 16C illustrates experimental measurements of relative intensity vs viewing angle of the three different wavelengths of light red ($\lambda_3$), green ($\lambda_2$), and blue ($\lambda_1$) according to the exemplary experimental setup of FIG. 16A.

FIG. 16C illustrates experimental measurements 1630 of relative intensity vs viewing angle of the three different wavelengths of light red ($\lambda_3$), green ($\lambda_2$), and blue ($\lambda_1$) according to the exemplary experimental setup 1600 of FIG. 16A. The focus length was measured at 19.8 mm, whereas the theoretical focus length of the measured grating 1610 was 20 mm.

The simulations and measurements of the gratings produced based on the one-step fabrication of a Fresnel mirror having integrated gratings using vibration texturing as disclosed herein show that tool path generation methods for both a turning mode and a scanning mode produce Fresnel mirrors with verifiable geometric and optical properties.

Figure 17A:
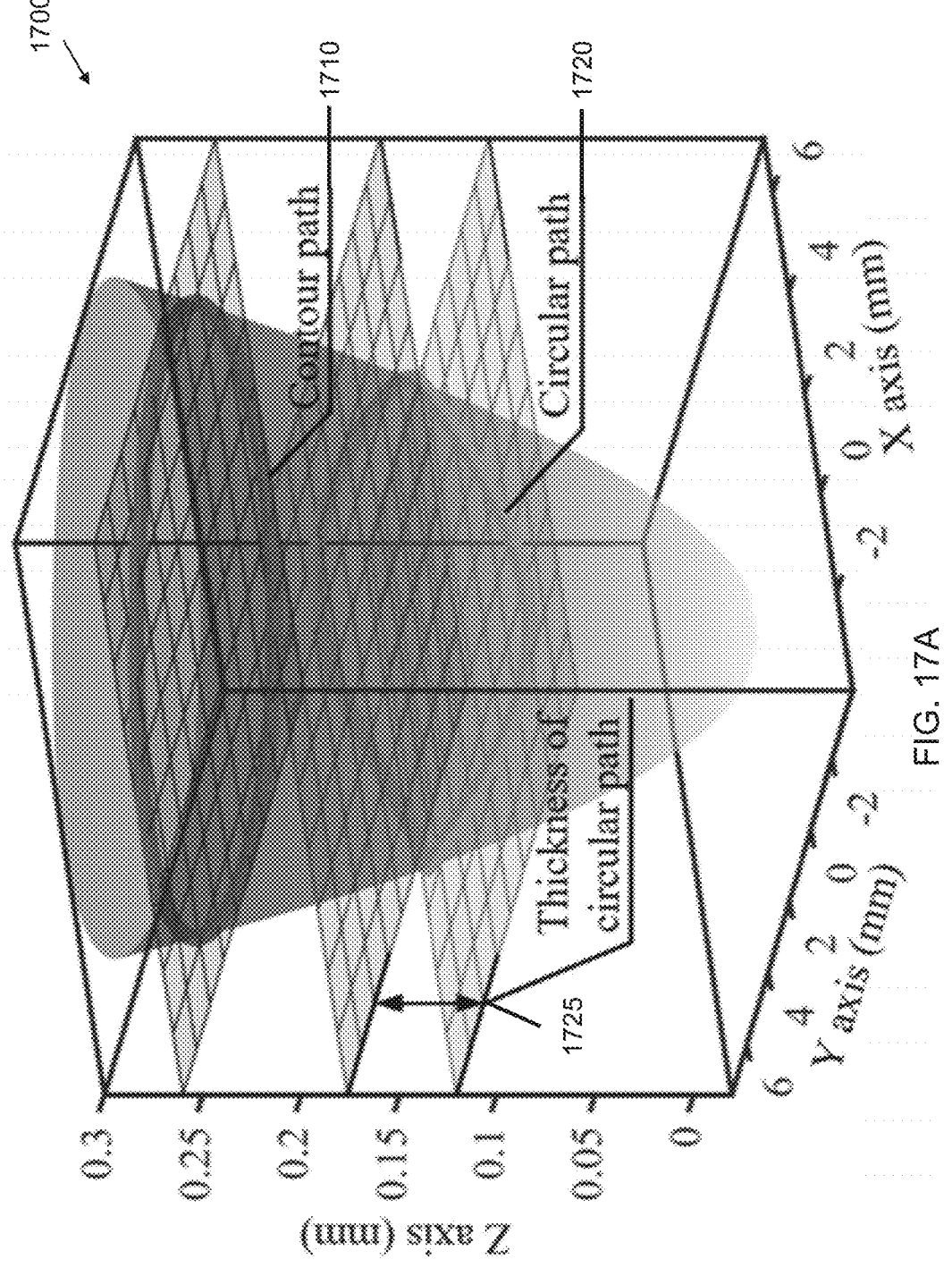
FIG. 17A illustrates a three-dimensional plot showing differences in an exemplary contour path and an exemplary circular path for a cutting tool in grating fabrication methodologies.

FIG. 17A illustrates a three-dimensional plot 1700 showing differences in an exemplary contour path 1710 and an exemplary circular path 1720 for a cutting tool in grating fabrication methodologies. As shown in FIG. 17A, a finite z-axis thickness 1725 of the grating substrate material results from cutting by the cutting tool along the circular path 1720 at different z-values according to the x-axis and y-axis location of the cutting tool along the circular path 1720.

Figure 17B:
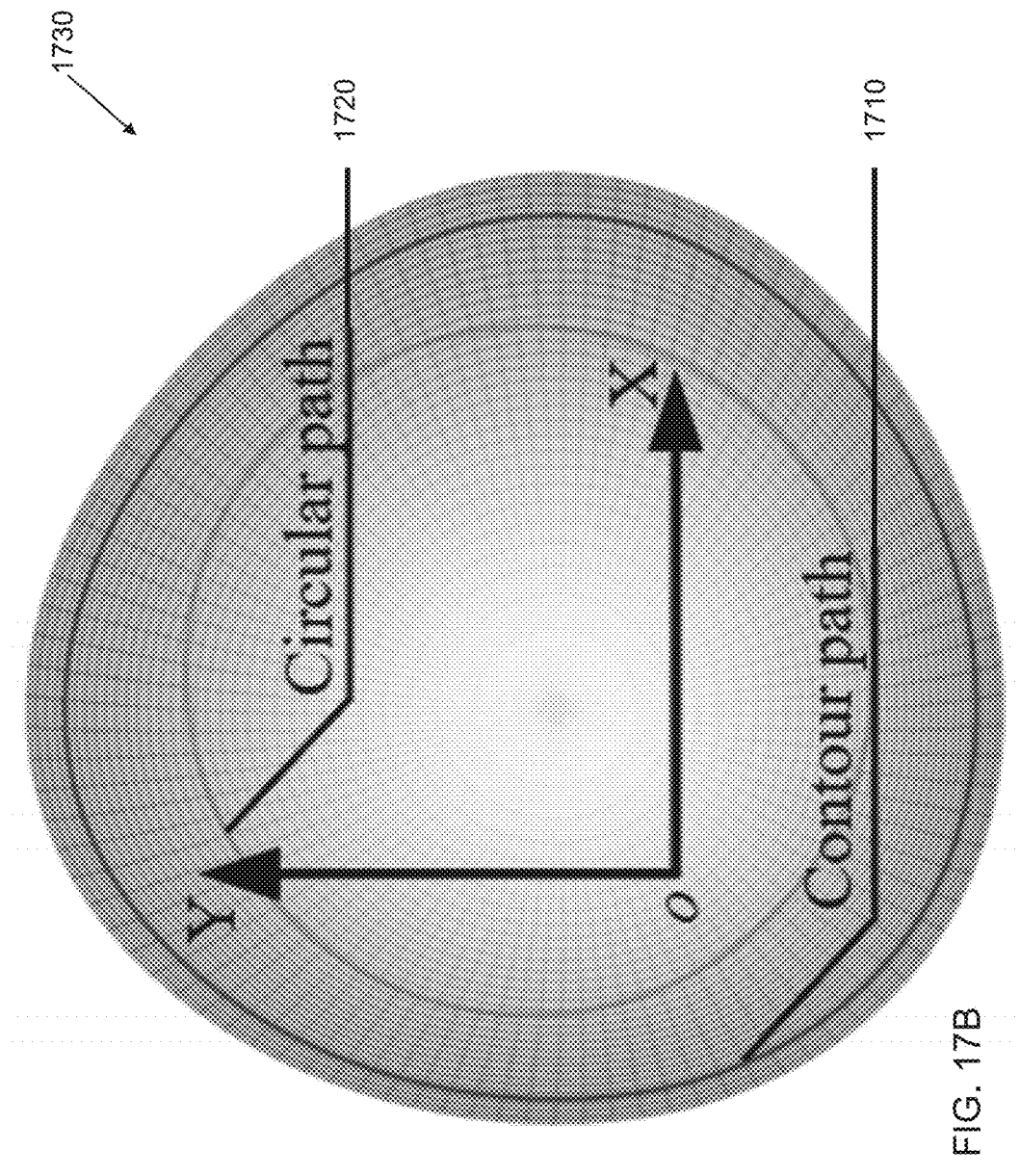
FIG. 17B illustrates a two-dimensional plot showing differences in the exemplary contour path and the exemplary circular path for the cutting tool in grating fabrication methodologies.

FIG. 17B illustrates a two-dimensional plot 1730 showing differences in the exemplary contour path 1710 and the exemplary circular path 1720 for the cutting tool in grating fabrication methodologies. The two-dimensional plot of FIG. 17B may include a top-down projection of the x-y plane of FIG. 17A such that all values of the z-axis of FIG. 17A are flattened in the plot of FIG. 17B. The top-down view shown in FIG. 17B shows that the circular path 1720 is circular with all points along the circular path 1720 being an equal distance to the center point of the circular path 1720 as shown projected onto a single plane. In contrast, the top-down view shown in FIG. 17B shows that the contour path 1710 has a varying distance to a central point of the contour path 1710 as shown projected onto a single plane.

In some applications, it may be desirable to use a Fresnel lens instead of freeform optics. Using a traditional spiral path for a cutting tool may not be practical because the lens profile depth may change along the spiral tool path, which may significantly limit an achievable minimum thickness for the Fresnel lens. However, using a contour path, e.g., the contour path 1710 of FIG. 17A, may facilitate realization of a theoretically zero thickness Fresnel lens.

Figure 18:
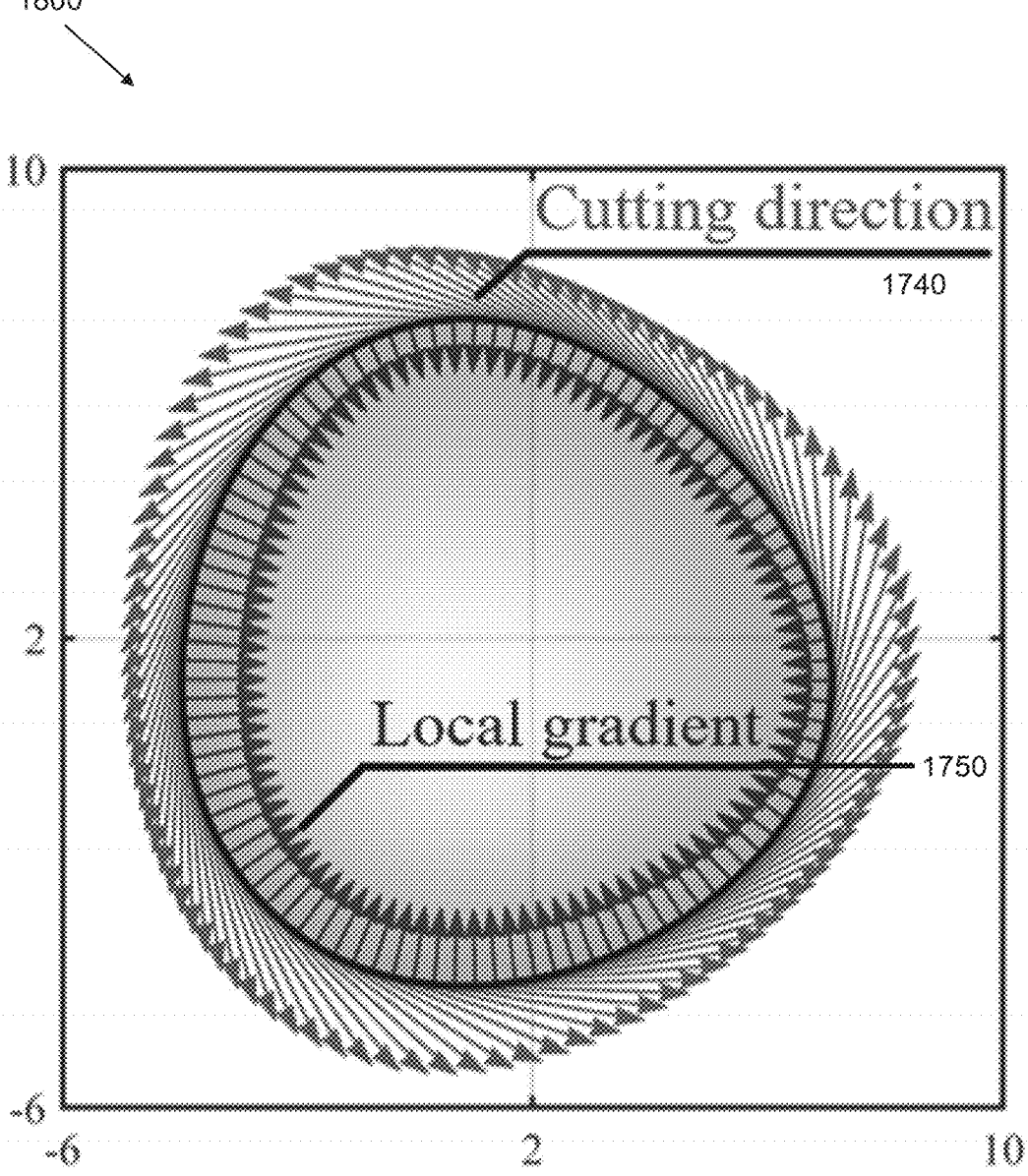
FIG. 18 illustrates a two-dimensional plot showing exemplary cutting directions and local gradients associated with the contour path illustrated in FIG. 17B.

FIG. 18 illustrates a two-dimensional plot 1800 showing exemplary cutting directions 1740 and local gradients 1750 associated with the contour path 1710 illustrated in FIG. 17B. The cutting strategy illustrated with the exemplary cutting directions 1740 may include coordinating the 4 axes of X, Y, Z, and C to maintain the cutting directions 1740 in the X-Y plane to be perpendicular to the local gradients 1750. When X axis movement of the cutting tool is performed without Y axis movement during cutting, the contour path 1710 may be followed with periodic movement. However, in this scenario, the cutting direction of the cutting tool may not fully follow the contour path 1710. This failure to fully follow the contour path 1710 may lead to flank surface interference and friction chatter. The friction chatter may rise to a severe level in this scenario. By also incorporating Y axis movement in addition to X axis movement of the cutting tool, an additional degree of freedom may be provided to the cutting tool to maintain the cutting directions 1740 to being perpendicular to the local gradients 1750 as illustrated in FIG. 18.

Figure 19A:
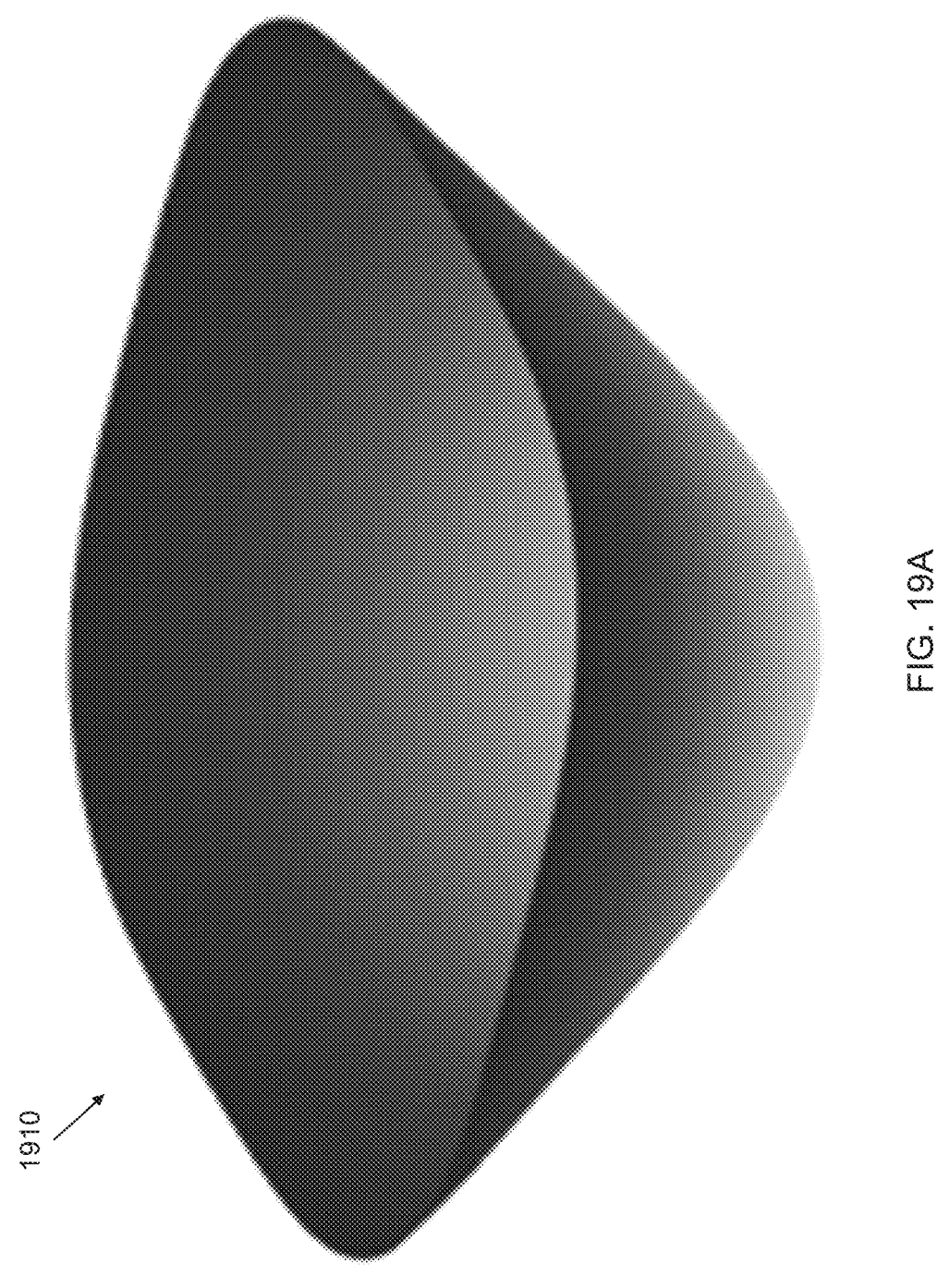
FIG. 19A illustrates an exemplary three-dimensional freeform surface.

FIG. 19A illustrates an exemplary three-dimensional freeform surface 1910. The freeform surface 1910 may be calculated from a Chebyshev polynomial Eq. 8:

$$Z = \tag{8}$$

$$f_z(X, Y) = -\left( \frac{c(X^2 + Y^2)}{1 + \sqrt{1 - c^2(X^2 + Y^2)}} + \sum_{i=0}^{I} \sum_{j=0}^{J} C_{ij} T_i\left(\frac{X}{L_x}\right) T_j\left(\frac{X}{L_y}\right) \right) + Z_0$$

$$T_i(x) = \cos(i \arccos x),$$

where x, y, z are global coordinates; X, Y, Z are workpiece coordinates; $\rho$, $\theta$ are workpiece polar coordinates; $\varphi$ is spindle angular position; $Z = f_z(X,Y)$ is the freeform surface function; $Z_0$ is the reference depth; $T_i(x)$ is the $i^{th}$ order Chebyshev polynomials at x; $C_{ij}$ is the 2-D Chebyshev polynomials coefficient; i, j are the order of Chebyshev polynomials; I, J are the maximum order of Chebyshev polynomials; c is the curvature of toric term; $h_n$ is the $n^{th}$ thread (facet) depth; N is the maximum index of thread (facet); $f_c(X, Y) = 0$ is the contour profile of the $n^{th}$ thread; k, K are the index and maximum index of discretized $\theta$; $M_n$ is the number of revolutions in the $n^{th}$ thread; and m is the index of revolution.

Figure 19B:
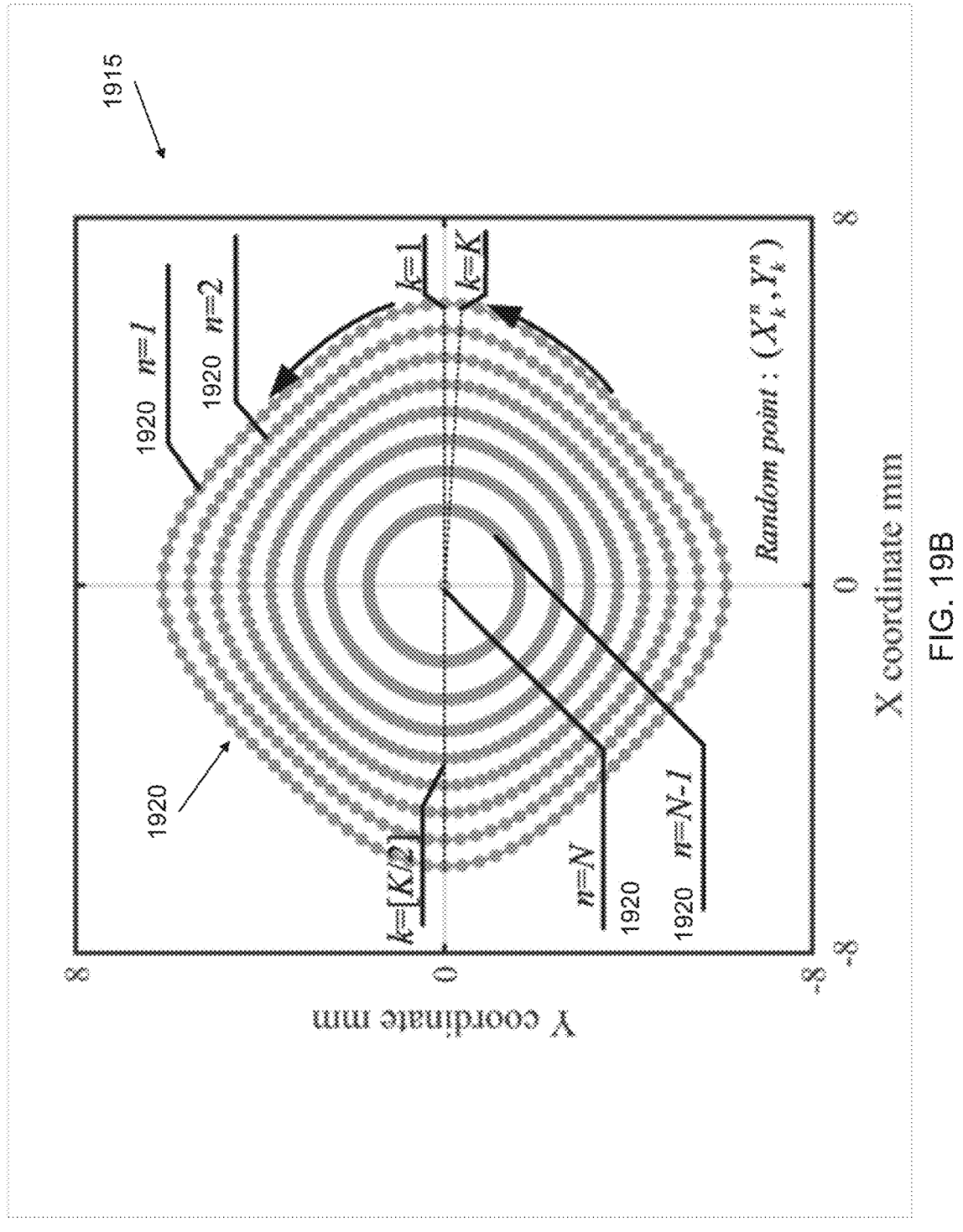
FIG. 19B illustrates a two-dimensional top-down view of the exemplary freeform surface of FIG. 19A projected onto an X-Y plane showing calculated contour lines numbered from n=1 furthest from the center coordinate (x=0, y=0) to n=N at the center coordinate.

FIG. 19B illustrates a two-dimensional top-down view 1915 of the exemplary freeform surface 1910 projected onto an X-Y plane showing calculated contour lines 1920 numbered from n=1 furthest from the center coordinate (x=0, y=0) to n=N at the center coordinate. Each contour line 1920 may include a total of k-K points, where k corresponds to an angle of a radial line extending from the center coordinate of the X-Y plane to the outermost contour line 1920 designated with n=1. Each contour line 1920 designated with a value of n ranging from 1 to N may include a point $$(X_k^n, Y_k^n)$$

designated with a value of k ranging from 1 to K. The points $$(X_k^n, Y_k^n)$$

for a given same value of k at different values of n may be along a same radial line extending outward from the center coordinate of the X-Y plane. The contour lines 1920 of each thread may be obtained by solving Eq. 9:

$$(n-1)h_n = \left( \frac{c\sqrt{X^2+Y^2}}{1+\sqrt{1-c^2(X^2+Y^2)}} + \sum_{i=0}^{I}\sum_{j=0}^{J} C_{ij} T_i\left(\frac{X}{L_x}\right) T_j\left(\frac{X}{L_x}\right) \right) - Z_0, \quad (9)$$

where $h_n$ is the height of the $n^{th}$ facet which may be freely designed as desired. The value of $h_n$ may be established by arithmetic progression starting from $-Z_0$. Eq. 7 may be computationally solved using a Newton-Raphson method on polar coordinates and transferring the results to contour lines 1920 as shown in FIG. 19B.

A straight-line distance between two adjacent contour lines 1920 may vary continuously because they are on a freeform surface. Therefore, a feed per revolution rate may not be constant. For a given feed per revolution rate, the revolutions of contour lines may be computed according to Eq. 10 to prevent a feed per revolution rate for each point (X, Y) from exceeding the given feed per revolution rate.

$$M_n \approx \frac{h/\Delta r}{\min_{k=1,\dots,K} \|\nabla f(X_{k,n}, Y_{k,n})\|}, \quad (10)$$

where at a revolution m from 1 to $M_n$, the quasi-spiral tool path is computed by the interpolation, where the kth point on the mth revolution is labelled as $(X_{k,m}, Y_{k,m})$, where:

$$X_{k,m} = \frac{m(k-1)}{M_n K}(X_{k,n+1} - X_{k,n}) + X_{k,n}, \quad (11)$$

$$Y_{k,m} = \frac{m(k-1)}{M_n K}(Y_{k,n+1} - Y_{k,n}) + Y_{k,n}, \quad (12)$$

$$Z_{k,m} = f_z(X_{k,m}, Y_{k,m}) - (n-1)h + e_k(X_{k,m}, Y_{k,m}), \quad (13)$$

where $e_h(X_{k,m}, Y_{k,m})$ is the tool compensation term.

Figure 20A:
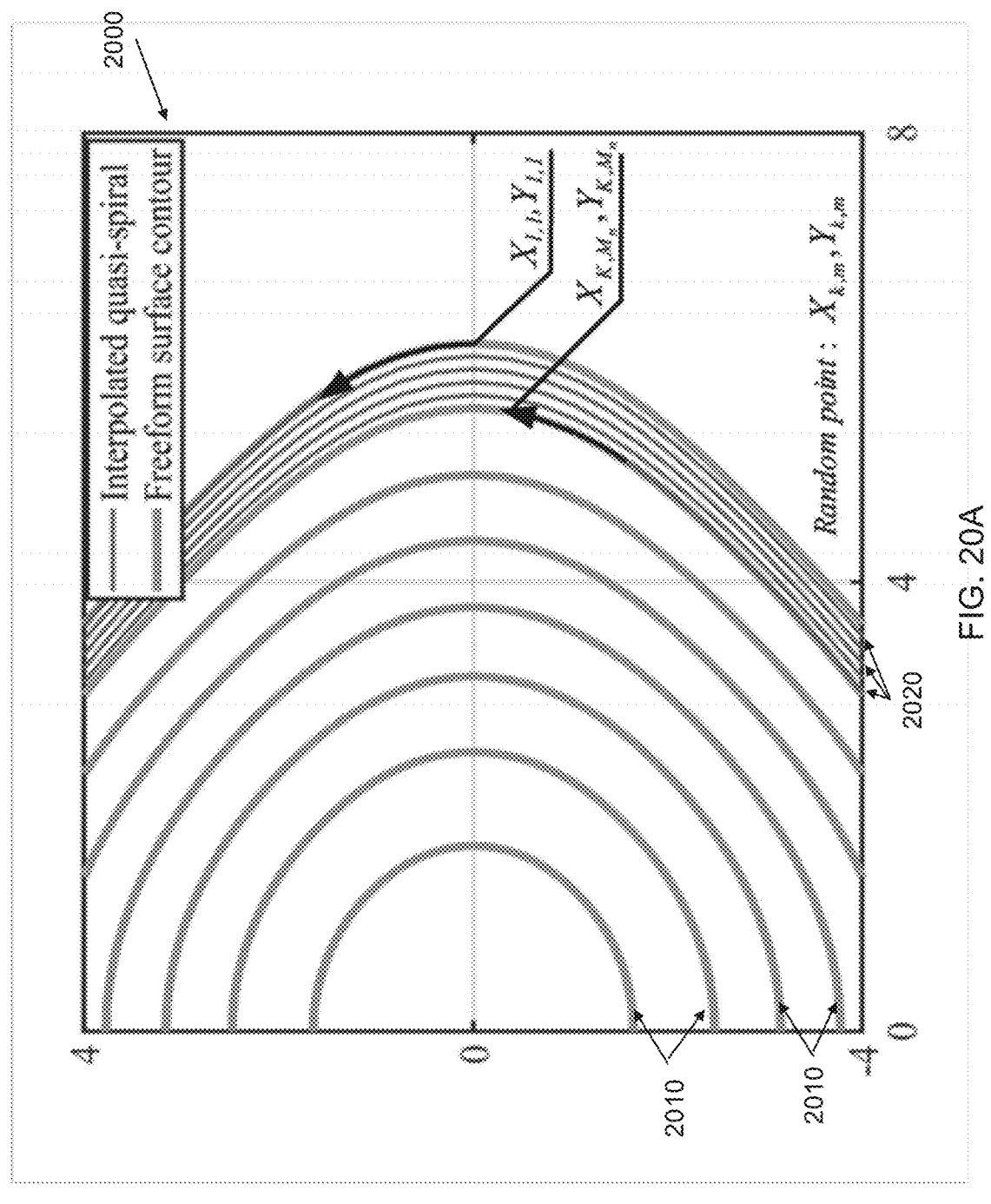
FIG. 20A illustrates a 2-D plot on the X-Y plane showing exemplary freeform surface contours and interpolated quasi-spiral tool paths.
Figure 20B:
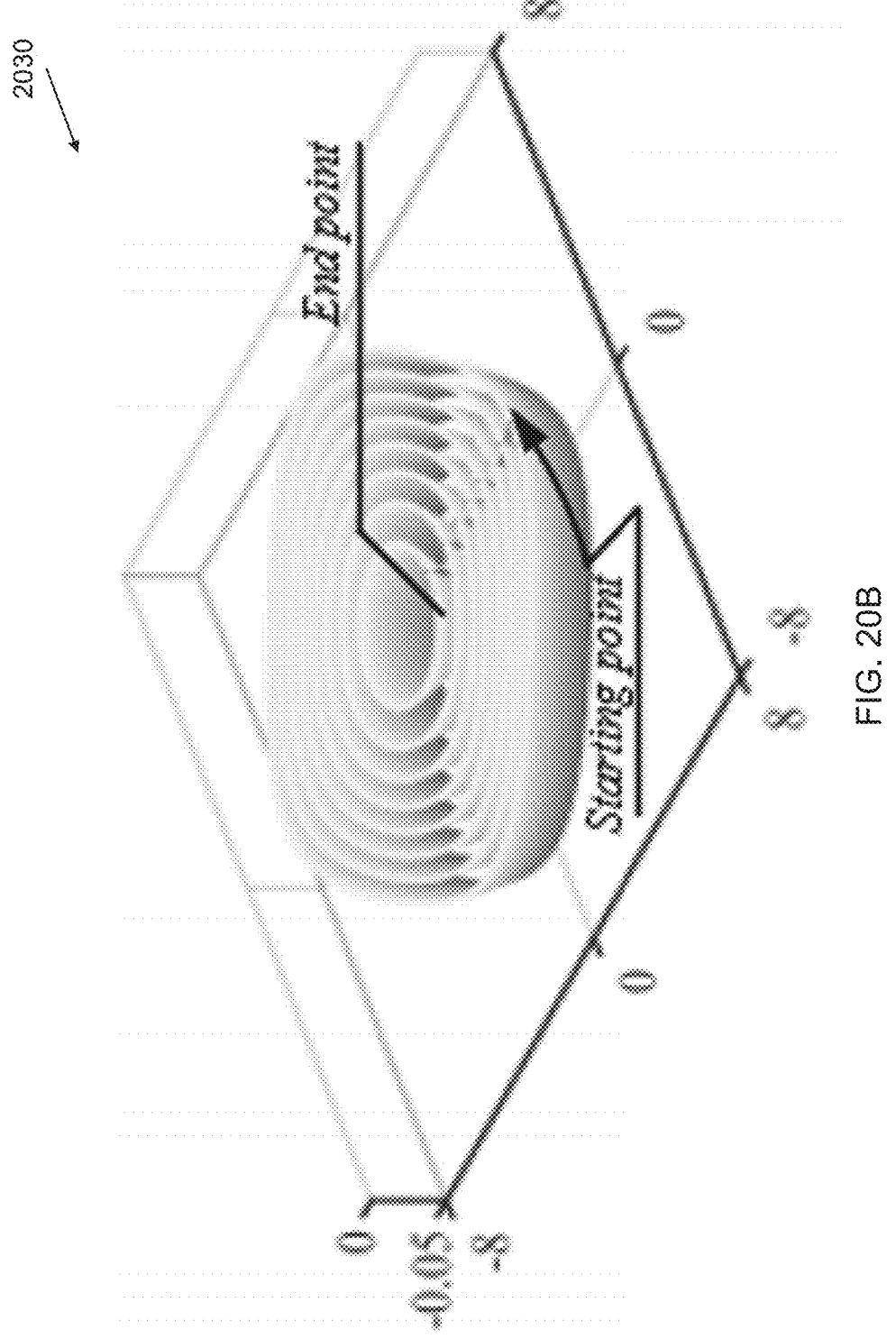
FIG. 20B illustrates an exemplary 3D profile of the interpolated quasi-spiral tool paths from a starting point furthest from the center coordinate of the X-Y plane to the end point closest to the center coordinate of the X-Y plane.

FIG. 20A illustrates a 2-D plot 2000 on the X-Y plane showing exemplary freeform surface contours 2010 and interpolated quasi-spiral tool paths 2020. FIG. 20B illustrates an exemplary 3D profile 2030 of the interpolated quasi-spiral tool paths 2020 from a starting point furthest from the center coordinate of the X-Y plane to the end point closest to the center coordinate of the X-Y plane. The quasi-spiral tool paths 2020 may be generated by the interpolation to compute the quasi-spiral tool path according to Eqs. 10-13 above.

Figure 21:
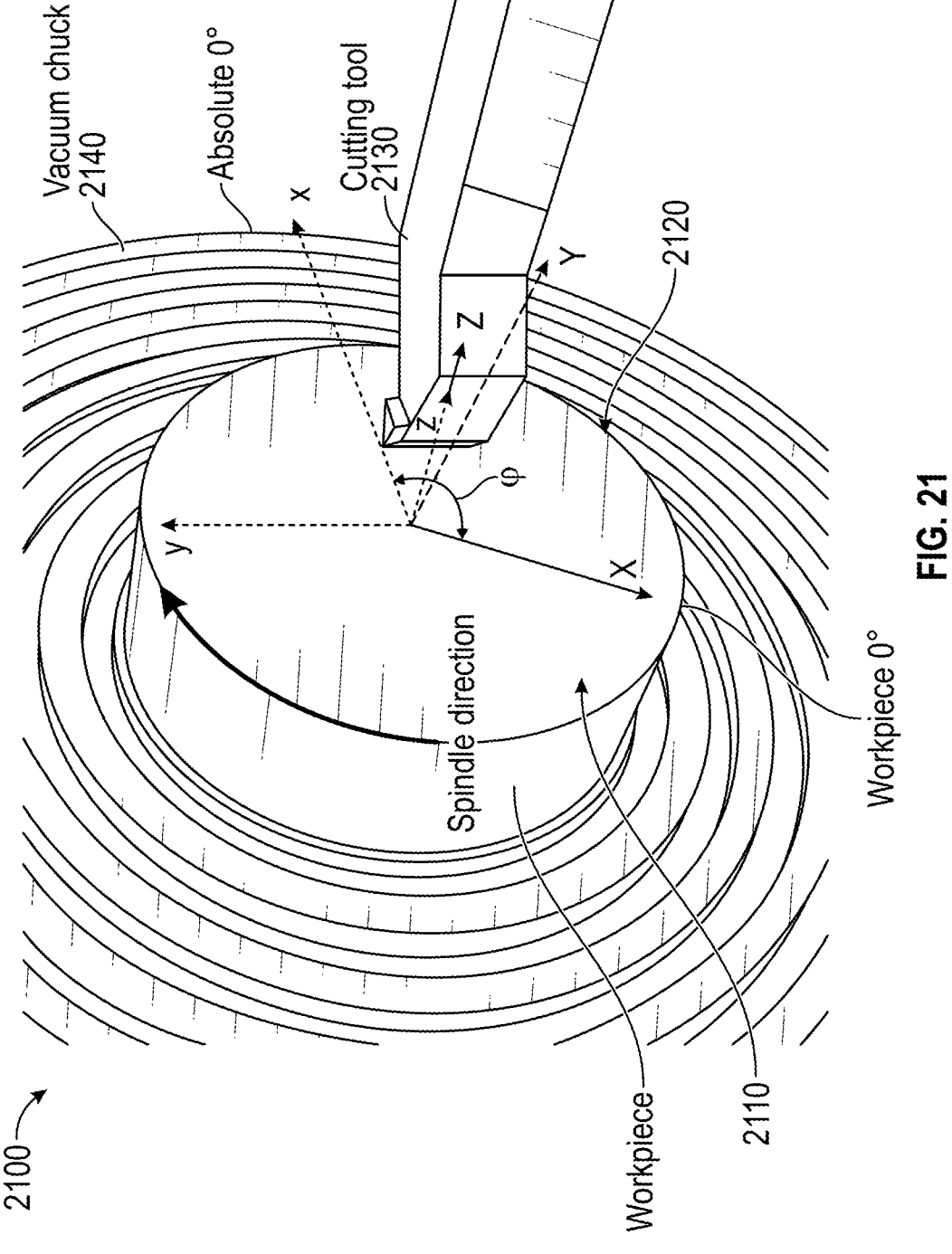
FIG. 21 illustrates a diagram of an exemplary apparatus for fabricating a grating by cutting a workpiece rotating on a spindle using a cutting tool.

FIG. 21 illustrates a diagram of an exemplary apparatus 2100 for fabricating a grating by cutting a workpiece 2110 rotating on a spindle 2120 using a cutting tool 2130. The workpiece 2110 may be centered on a vacuum chuck 2140. Workpiece coordinates X, Y, Z may be defined relative to the center point of the workpiece 2110 mounted on the rotating spindle 2120, while global coordinates x, y, z may be defined relative to the center point of the spindle 2120 and vacuum chuck 2140. The spindle 2120 may rotate in a clockwise direction, for example. The Z axis and the z axis may be coincident with one another, while the X axis and x axis may be offset by an angle φ that continuously changes as the spindle 2120 rotates. The workpiece coordinates on the X-Y plane may rotate with the continuous rotation of the C-axis while the orientation of the cutting tool 2130 continues to face the +y axis on the global coordinate system. The actual cutting tool path on the global coordinate system may be computed using the following projection relationship, which includes two geometric relationships as shown in Eqs. 14, 15, and 16. These two geometric relationships shown include the following:

1. The trajectory in the workpiece coordinate system is on the desired quasi-spiral.
2. The cutting direction is perpendicular to the local gradient.

$$\begin{bmatrix} X_{k,m} \\ Y_{k,m} \\ \nabla_x f(X_{k,m}, Y_{k,m}) \\ \nabla_y f(X_{k,m}, Y_{k,m}) \end{bmatrix} = \quad (14)$$

$$\begin{bmatrix} \cos(\varphi_{k,m}) & \sin(\varphi_{k,m}) & 0 & 0 \\ -\sin(\varphi_{k,m}) & \cos(\varphi_{k,m}) & 0 & 0 \\ 0 & 0 & \cos(\varphi_{k,m}) & \sin(\varphi_{k,m}) \\ 0 & 0 & -\sin(\varphi_{k,m}) & \cos(\varphi_{k,m}) \end{bmatrix} \begin{bmatrix} x_{k,m} \\ y_{k,m} \\ -1 \\ 0 \end{bmatrix},$$

$$\frac{\partial f(X, Y)}{\partial X} = \quad (15)$$

$$\frac{cX}{\sqrt{1-c^2(X^2+Y^2)}} + \sum_{i=0}^{i}\sum_{j=0}^{j} C_{ij} \frac{i\sin\left(i\arccos\left(\frac{X}{L_x}\right)\right)}{\sqrt{1-\left(\frac{X}{L_x}\right)^2}} \cos\left(j\arccos\left(\frac{Y}{L_y}\right)\right), \quad (16)$$

$$\frac{\partial f(X, Y)}{\partial Y} =$$

$$\frac{cX}{\sqrt{1-c^2(X^2+Y^2)}} + \sum_{i=0}^{i}\sum_{j=0}^{j} C_{ij} \cos\left(i\arccos\left(\frac{X}{L_x}\right)\right) \frac{j\sin\left(j\arccos\left(\frac{Y}{L_y}\right)\right)}{\sqrt{1-\left(\frac{Y}{L_y}\right)^2}}.$$

Figure 22:
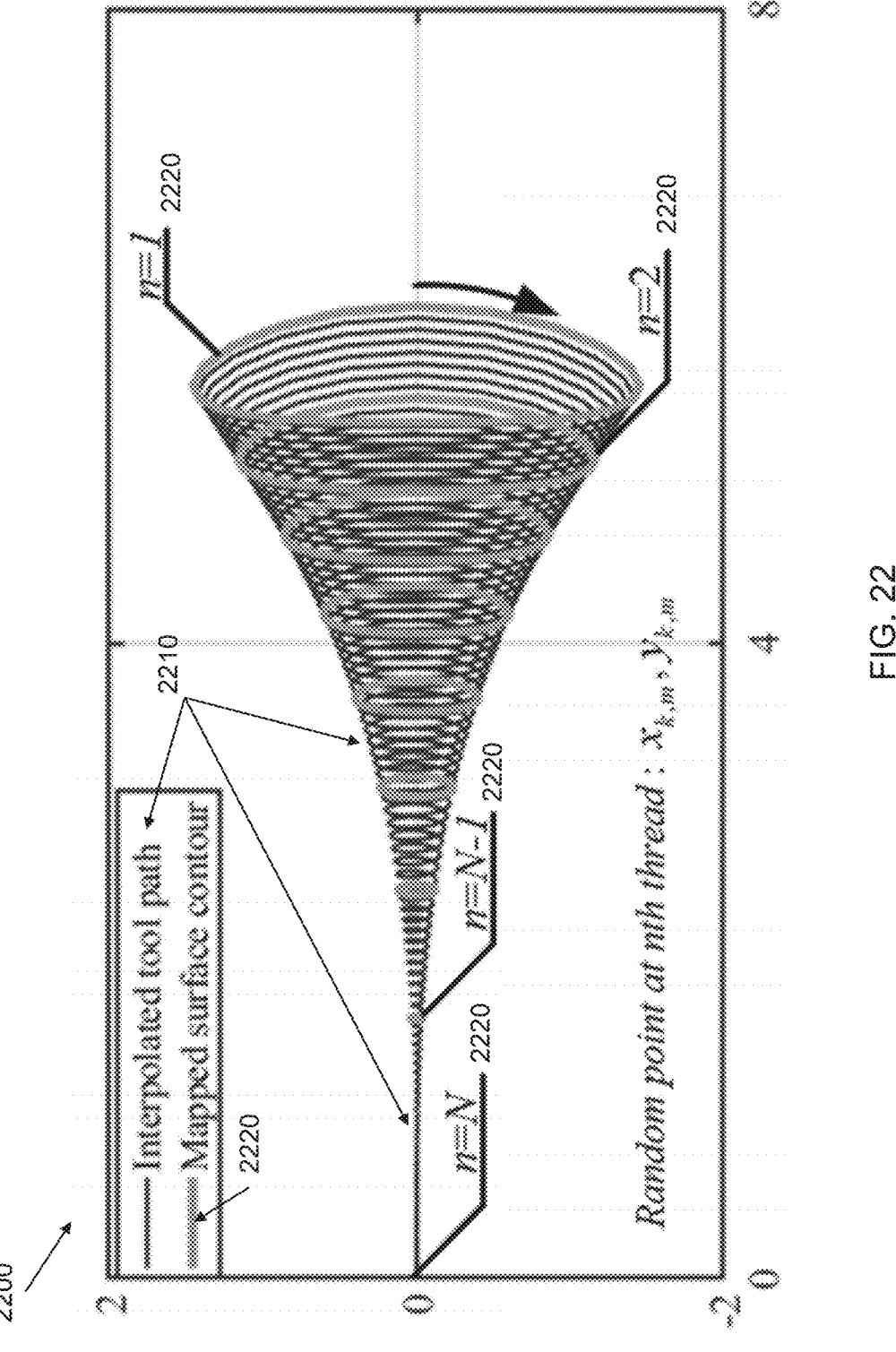
FIG. 22 illustrates an exemplary plot showing the calculated tool path and the mapped surface contours on the global x-y plane.

FIG. 22 illustrates an exemplary plot 2200 showing the calculated tool path 2210 and the mapped surface contours 2220 on the global x-y plane. The associated calculated tool path on the global z-axis may be consistent with the workpiece coordinate. The mapped surface contours 2220 are shown for values of n ranging from n=1 at the highest value of x to n=N at the global center point (x=0, y=0) on the global x-y plane. A random point on the $n^{th}$ thread may be designated as $(x_{k,m}, y_{k,m})$.

Figure 23:
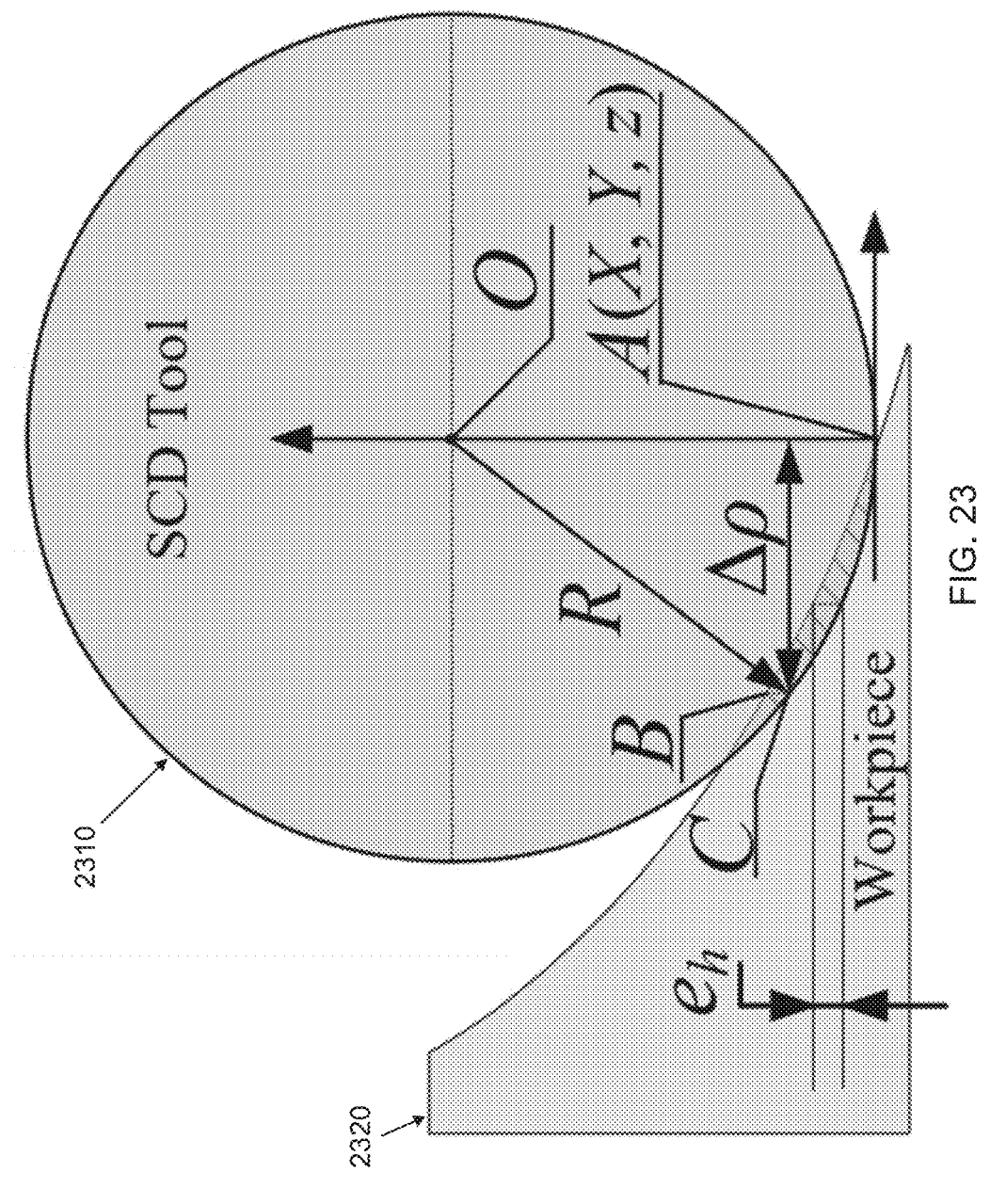
FIG. 23 is a diagram that illustrates an exemplary method of compensating for a deviation of a single crystal diamond (SCD) tool's real cutting point from the desired cutting point.

FIG. 23 is a diagram that illustrates an exemplary method of compensating for a deviation of a single crystal diamond (SCD) tool 2310's real cutting point from the desired cutting point. When the SCD tool 2310 is positioned at a point (X, Y, z) for cutting the workpiece 2320, the SCD tool 2310 may be moved along the z-axis with a displacement $e_h$ as described in Eq. 17 to cause the tool edge to stay tangential to the desired surface.

$$e_h(X, Y) = \max_{\Delta\rho=[0,\infty)} \left[ f_z\left(X + \frac{\nabla_x f_z(X, Y)}{\|\nabla f_z(X, Y)\|}\Delta\rho, Y + \frac{\nabla_y f_z(X, Y)}{\|\nabla f_z(X, Y)\|}\Delta\rho\right) - \right. \quad (17)$$
$$\left. f_z(X, Y) - \left(R - \sqrt{R^2 - \Delta\rho^2}\right) \right]$$

15

Figure 24:
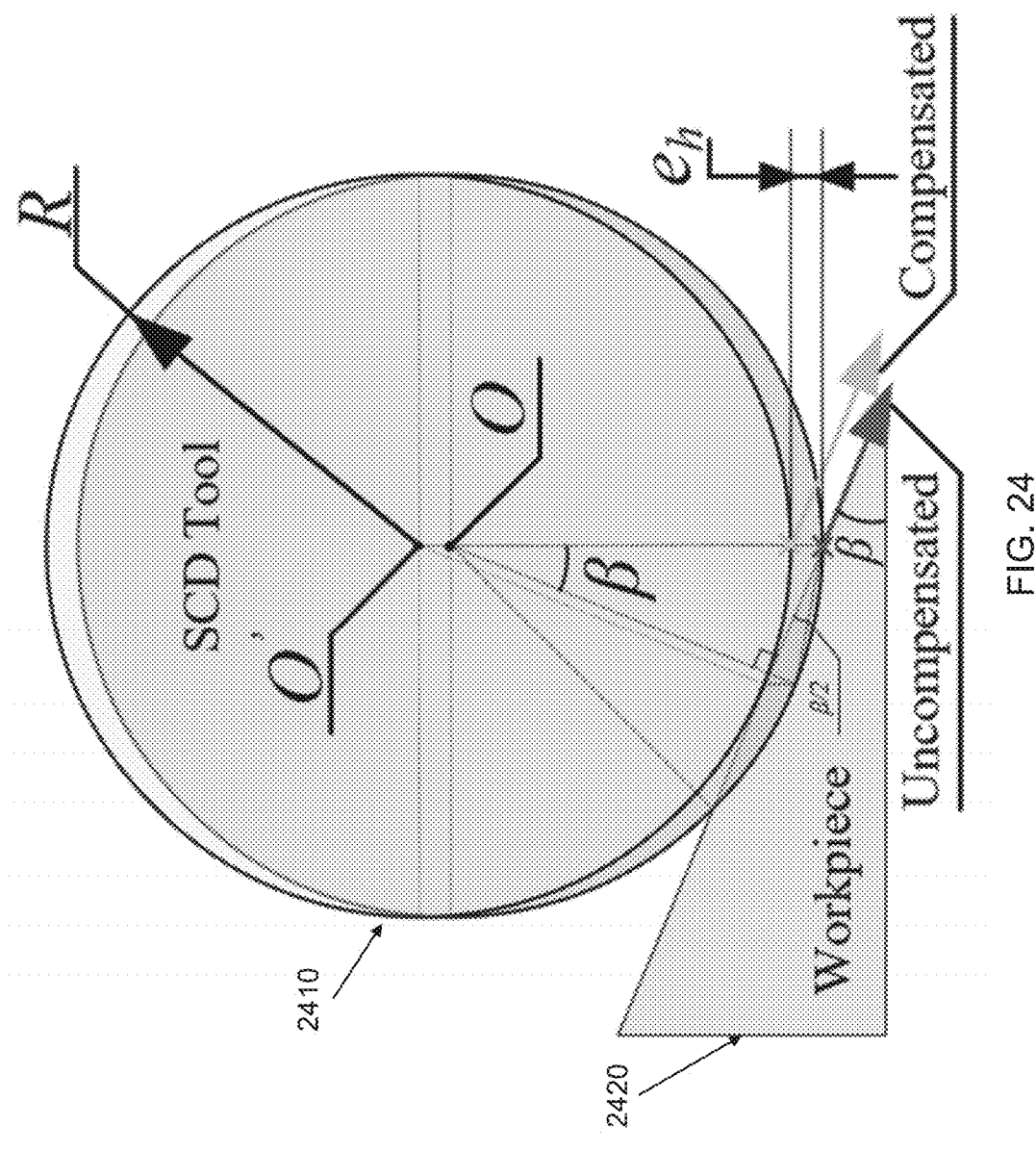
FIG. 24 is a diagram that illustrates an exemplary method of compensating for a deviation of an SCD tool's real cutting point from the desired cutting point on a workpiece when the local gradient is constant.

FIG. 24 is a diagram that illustrates an exemplary method of compensating for a deviation of an SCD tool 2410's actual cutting point from the desired cutting point on a workpiece 2420 when the local gradient is constant. When cutting Fresnel optics, the cutting tool radius may be designed to be small due to an error caused by the tool radius. As a result, the local gradient may be assumed to be a constant at the workpiece coordinate (X, Y) when computing $e_h$. The value of $e_h$ may be determined by solving Eqs. 18 and 19:

$$e_h = R\tan(\beta)\tan\left(\frac{\beta}{2}\right) \tag{18}$$

$$\beta = \arctan(\|\nabla f_z(X, Y)\|) \tag{19}$$

Figure 25A:
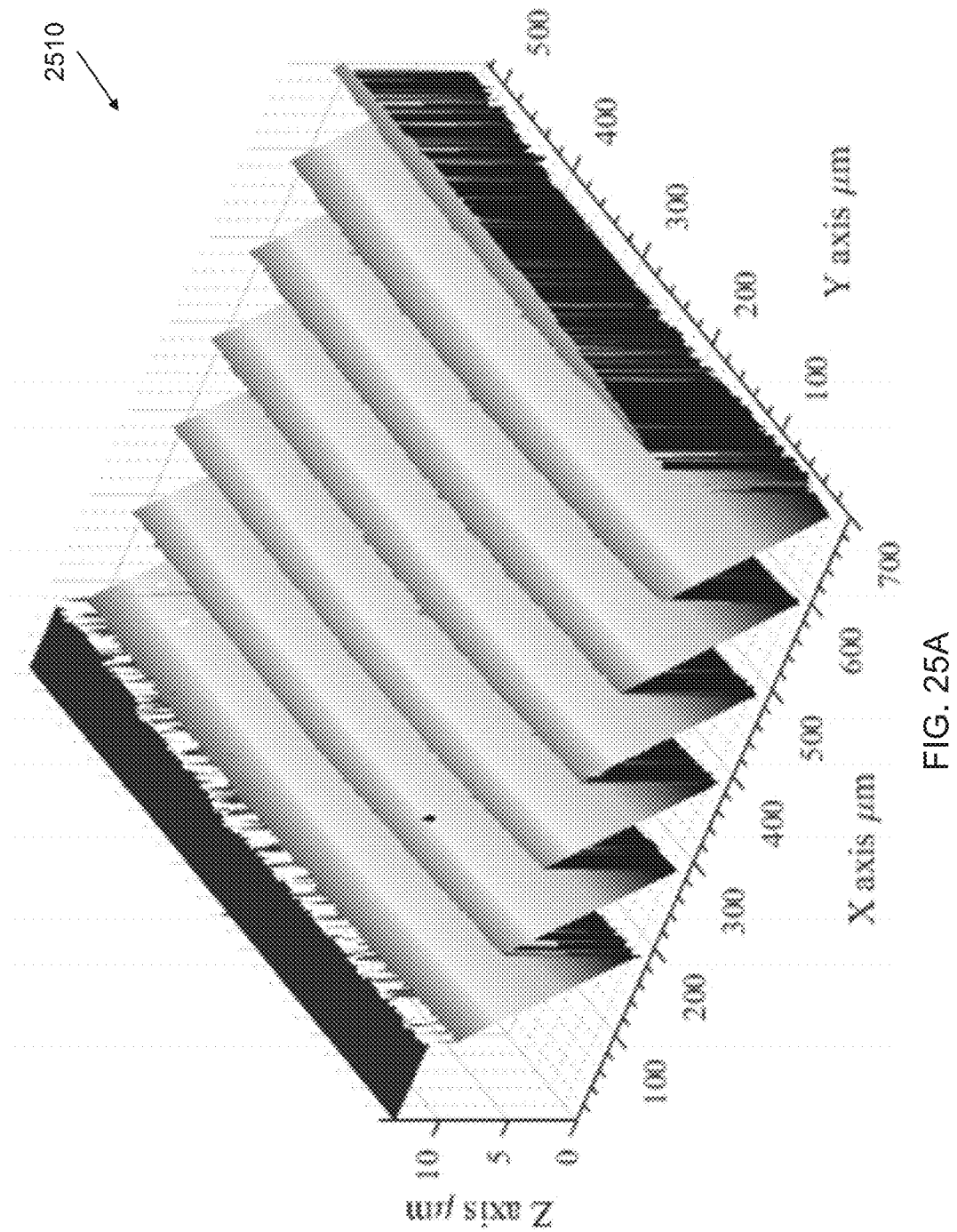
FIG. 25A illustrates a 3D plot of exemplary dimensional measurements on an edge of a machined freeform Fresnel mirror.
Figure 25B:
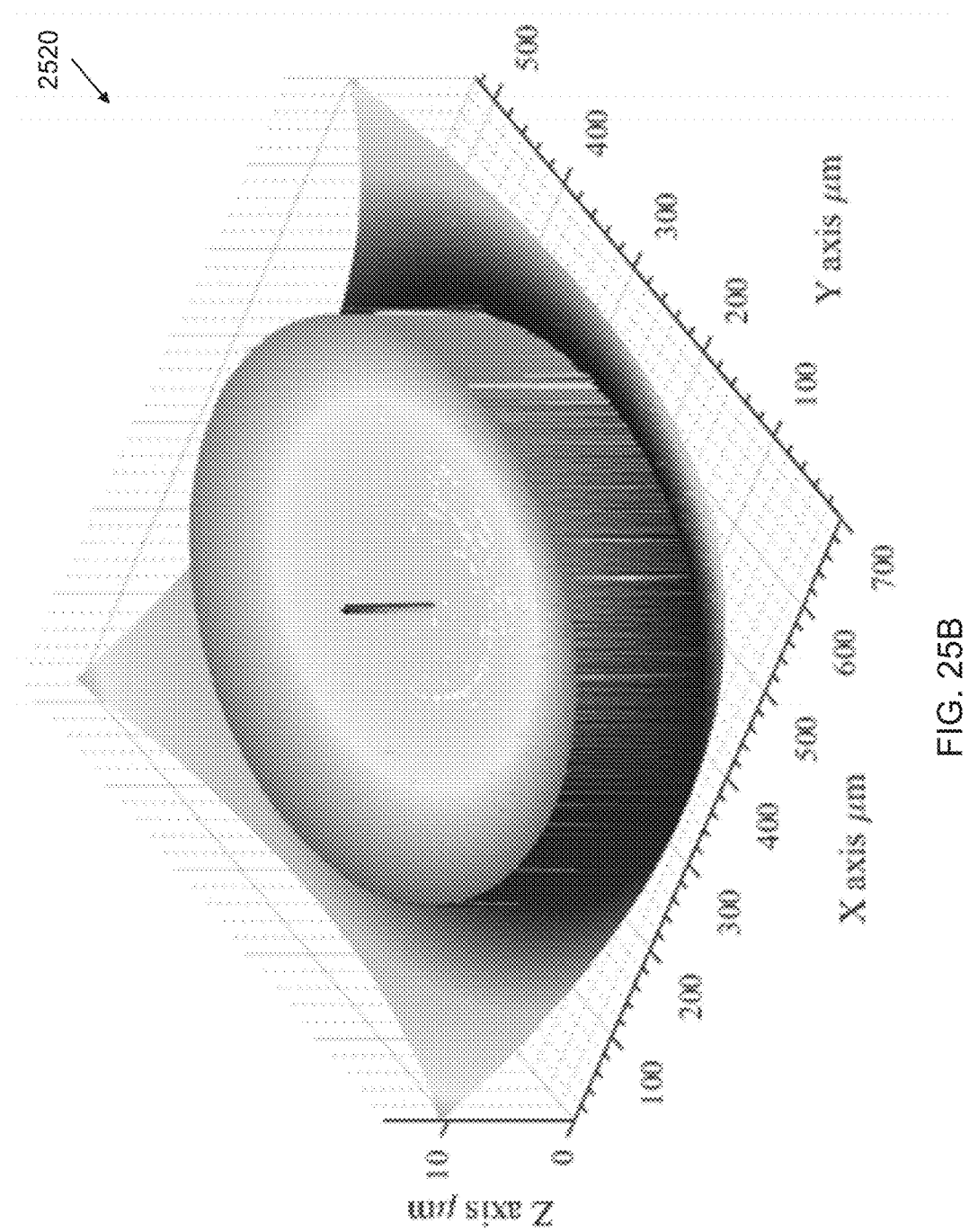
FIG. 25B illustrates a 3D plot of exemplary dimensional measurements of a center of a machined freeform Fresnel mirror.
Figure 25C:
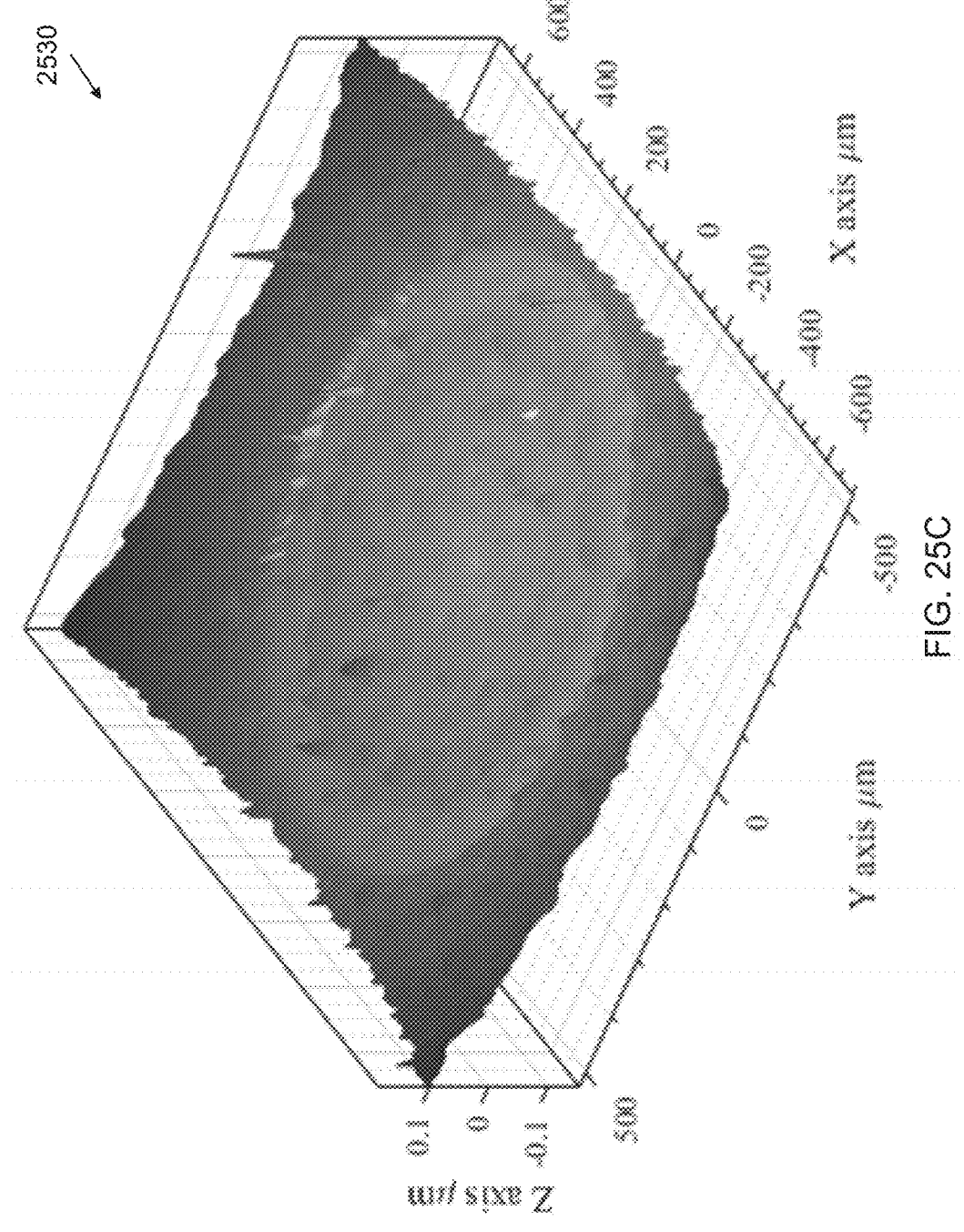
FIG. 25C illustrates a 3D plot of exemplary dimensional measurements of error at the center of the machined freeform Fresnel mirror.

FIG. 25A illustrates a 3D plot of exemplary dimensional measurements 2510 on an edge of a machined freeform Fresnel mirror. FIG. 25B illustrates a 3D plot of exemplary dimensional measurements 2520 of a center of a machined freeform Fresnel mirror. FIG. 25C illustrates a 3D plot of exemplary dimensional measurements 2530 of error at the center of the machined freeform Fresnel mirror. The measurements of FIGS. 25A, 25B, and 25C were taken of an exemplary Fresnel mirror fabricated using the methodologies described herein.

FIG. 26 is a flow chart that illustrates a method 2600 of fabricating hybrid optics comprising high-frequency variable gratings superimposed on freeform optical surfaces. The method 2600 may be performed by a computing processor executing a series of instructions stored in a memory or on a non-transitory machine-readable memory. The method 2600, in various embodiments, may be implemented with fewer or more steps illustrated and described in this example shown in FIG. 26. Some procedures in the drawing illustrating method 2600 may be substituted with others in various instantiations of the method 2600. In various examples and implementations, operations, method steps, and algorithms discussed elsewhere in this disclosure may be substituted for, added to, and/or combined with any of the operations illustrated in and discussed with reference to FIG. 26.

In an operation 2605, a three-dimensional freeform surface for machining a freeform lens from a workpiece may be computed based on a Chebyshev polynomial. The cutting tool may be controlled to traverse the surface of the workpiece based on the Chebyshev polynomial to machine a freeform surface.

In an operation 2610, quasi-spiral tool paths for the cutting tool to traverse on the surface of the workpiece may be computed. The quasi-spiral tool paths may be used to create control signals to transmit to the fabrication apparatus in operation 2620.

In an operation 2615, deviation of a cutting tool's actual cutting point on a workpiece relative to the desired cutting point may be compensated for. The compensation may be implemented as a computed modification of a control signal to be sent to the fabrication apparatus in operation 2620.

In an operation 2620, a control system may generate one or more control signals for controlling fabrication of a coded lens from a workpiece. The control signals may be generated according to a computing processor executing a series of computing instructions stored on a tangible storage medium for controlling the cutting tool and/or the platform holding the workpiece to fabricate a hybrid optical element having one or more freeform optical surfaces superimposed with high-frequency variable gratings. The relative motion may be along an X, Y, and/or Z direction relative to the workpiece and/or along an x, y, and/or z direction relative to a platform that is holding the workpiece. The relative motion may be along an R, Θ, and/or Z direction relative to the workpiece and/or along an r, θ, and/or z direction relative to a platform that is holding the workpiece.

In an operation 2625, a cutting tool is caused to traverse the workpiece surface along specified 2-D path, based on received signal. The cutting tool may be positioned against a workpiece to perform cutting and machining.

In an operation 2630, the cutting tool may controllably cut the workpiece at specified position-dependent depth while traversing the surface. The cutting tool may machine the workpiece into a freeform lens according to a predetermined shape profile.

In an operation 2635, the cutting tool may be caused to generate ultrasonic vibration trajectories of the cutting tool while cutting gratings into the workpiece. The cutting tool may cut one or more grating lines along a trajectory on the workpiece. The cutting tool may cut the grating lines immediately after, interleaved with, or at the same time as machining the workpiece into a freeform lens.

In operations 2630 and 2635, one or both of the cutting tool and the workpiece may be caused to move relative to the other in order to position the cutting tool against the workpiece. The motion may be caused by one or more motors acting in response to the control signals provided by a control system. The control system may be generating the control signals according to a computing processor executing a series of computing instructions stored on a tangible storage medium for controlling the cutting tool and/or the platform holding the workpiece to fabricate a hybrid optical element having one or more freeform optical surfaces superimposed with high-frequency variable gratings. The relative motion may be along an X, Y, and/or Z direction relative to the workpiece and/or along an x, y, and/or z direction relative to a platform that is holding the workpiece. The relative motion may be along an R, Θ, and/or Z direction relative to the workpiece and/or along an r, θ, and/or z direction relative to a platform that is holding the workpiece. Material cut from the workpiece by the cutting tool may be removed from the cutting edge, for example, by a vacuum element.

The method 2600 may continue after operation 2635 to either optional operation 2615 or operation 2620 and repeat as long as it takes to complete the fabrication of the coded lens.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system for fabricating coded lenses comprising:
a cutting tool configured to controllably cut a workpiece at a specified position-dependent depth while traversing a surface of the workpiece along a specified two-dimensional path;
a signal generator operative to generate a signal for controlling fabrication of a coded lens from the workpiece; and
a vibration tool operative to ultrasonically vibrate the cutting tool for cutting of gratings on the workpiece, wherein the cutting tool is configured to machine a freeform surface and fabricate a variable grating on the machined freeform surface; and
a processor configured to control the cutting tool and the vibration tool for machining a freeform lens from the workpiece, wherein computing the three-dimensional freeform surface is based on a Chebyshev polynomial $$Z = f_z(X, Y) = -\left( \frac{c(X^2 + Y^2)}{1 + \sqrt{1 + c^2(X^2 + Y^2)}} + \sum_{i=0}^{I}\sum_{j=0}^{J} C_{ij} T_i\left(\frac{X}{L_x}\right) T_j\left(\frac{X}{L_y}\right) \right) + Z_0$$

$$T_i(x) = \cos(i \arccos x),$$

where x, y, z are global coordinates, X, Y, Z are workpiece coordinates, $\rho$, $\theta$ are workpiece polar coordinates, $Z=f_z(X,Y)$ is a freeform surface function, $Z_0$ is a reference depth, $T_i$ (x) is a $i^{th}$ order Chebyshev polynomials at x, $C_{ij}$ is a 2-D Chebyshev polynomials coefficient, i, j are a order of Chebyshev polynomials, I, J are a maximum order of Chebyshev polynomials, c is a curvature of toric term.

2. The system of claim 1, wherein the cutting tool is configured to rotate to cut the workpiece in directions that are perpendicular to local gradients on the workpiece.

3. The system of claim 1, further comprising a vacuum to remove cut material from the cutting tool while the cutting tool is cutting the workpiece.

4. The system of claim 1, further comprising a mechanism to feed the workpiece linearly along an axis relative to the cutting tool while the cutting tool cuts the workpiece.

5. The system of claim 1, further comprising a spindle operative to hold the workpiece and turn the workpiece about a central axis to facilitate the cutting tool to cut the workpiece while the workpiece is turning.

6. The system of claim 1, wherein the vibration tool includes an elliptical vibration tool.

7. A method for fabricating coded lenses comprising:
generating a signal for controlling fabrication of a coded lens from a workpiece;
causing a cutting tool to traverse a surface of the workpiece along a specified two-dimensional path, based on the signal;
controllably cutting a workpiece at a specified position-dependent depth while traversing the surface of the workpiece along the specified two-dimensional path, based on the signal; and
ultrasonically vibrating the cutting tool for cutting gratings on the workpiece; and
computing a three-dimensional freeform surface for machining a freeform lens from the workpiece, wherein computing the three-dimensional freeform surface is based on a Chebyshev polynomial $$Z = f_z(X, Y) = -\left( \frac{c(X^2 + Y^2)}{1 + \sqrt{1 - c^2(X^2 + Y^2)}} + \sum_{i=0}^{I}\sum_{j=0}^{J} C_{ij} T_i\left(\frac{X}{L_x}\right) T_j\left(\frac{X}{L_y}\right) \right) + Z_0$$

$$T_i(x) = \cos(i \arccos x)$$

where x, y, z are global coordinates, X, Y, Z are workpiece coordinates, $\rho$, $\theta$ are workpiece polar coordinates, $Z=f_z(X,Y)$ is a freeform surface function, $Z_0$ is a reference depth, $T_i$ (x) is a $i^{th}$ order Chebyshev polynomials at x, $C_{ij}$ is a 2-D Chebyshev polynomials coefficient, i, j are a order of Chebyshev polynomials, I, J are a maximum order of Chebyshev polynomials, c is a curvature of toric term.

8. The method of claim 7, further comprising causing the cutting tool to traverse the surface of the workpiece based on the Chebyshev polynomial to machine a freeform surface.

9. The method of claim 7, wherein causing the cutting tool to traverse the surface of the workpiece along the specified two-dimensional path comprises feeding the workpiece along a linear direction at a variable rate.

10. The method of claim 7, wherein causing the cutting tool to traverse the surface of the workpiece along the specified two-dimensional path comprises causing the cutting tool to traverse the surface of the workpiece along quasi-spiral tool paths computed according to $$M_n \approx \frac{h/\Delta r}{\min\limits_{k=1,\ldots,K} \|\nabla f(X_{k,n}, Y_{k,n})\|},$$

where at a revolution m from 1 to $M_n$, the quasi-spiral tool path is computed by an interpolation, where a $k^{th}$ point on a $m^{th}$ revolution is labelled as $(X_{k,m}, Y_{k,m})$, where $$X_{k,m} = \frac{m(k-1)}{M_n K}(X_{k,n+1} - X_{k,n}) + X_{k,n},$$

$$Y_{k,m} = \frac{m(k-1)}{M_n K}(Y_{k,n+1} - Y_{k,n}) + Y_{k,n},$$

$$Z_{k,m} = f_z(X_{k,m}, Y_{k,m}) - (n-1)h + e_k(X_{k,m}, Y_{k,m}),$$

where $e_h(X_{k,m}, Y_{k,m})$ is a tool compensation term.

11. The method of claim 7, wherein the specified two-dimensional path is computed according to $$\begin{bmatrix} X_{k,m} \\ Y_{k,m} \\ \nabla_x f(X_{k,m}, Y_{k,m}) \\ \nabla_y f(X_{k,m}, Y_{k,m}) \end{bmatrix} = \begin{bmatrix} \cos(\varphi_{k,m}) & \sin(\varphi_{k,m}) & 0 & 0 \\ -\sin(\varphi_{k,m}) & \cos(\varphi_{k,m}) & 0 & 0 \\ 0 & 0 & \cos(\varphi_{k,m}) & \sin(\varphi_{k,m}) \\ 0 & 0 & -\sin(\varphi_{k,m}) & \cos(\varphi_{k,m}) \end{bmatrix} \begin{bmatrix} x_{k,m} \\ y_{k,m} \\ -1 \\ 0 \end{bmatrix},$$

$$\frac{\partial f(X, Y)}{\partial X} =$$

$$\frac{cX}{\sqrt{1 - c^2(X^2 + Y^2)}} + \sum_{i=0}^{i}\sum_{j=0}^{j} C_{ij} \frac{i\sin\left(i\arccos\left(\frac{X}{L_x}\right)\right)}{\sqrt{1 - \left(\frac{X}{L_x}\right)^2}} \cos\left(j\arccos\left(\frac{Y}{L_y}\right)\right)$$

$$\frac{\partial f(X, Y)}{\partial Y} =$$

$$\frac{cX}{\sqrt{1 - c^2(X^2 + Y^2)}} + \sum_{i=0}^{i}\sum_{j=0}^{j} C_{ij} \cos\left(i\arccos\left(\frac{X}{L_x}\right)\right) \frac{j\sin\left(j\arccos\left(\frac{Y}{L_y}\right)\right)}{\sqrt{1 - \left(\frac{Y}{L_y}\right)^2}}$$

such that a cutting tool's trajectory in a workpiece coordinate system (X, Y, Z) is on a desired quasi-spiral, and a cutting direction is perpendicular to a local gradient.

12. The method of claim 7, further comprising compensating for a deviation of a cutting tool's actual cutting point from the desired cutting point on the workpiece by computing $e_h$ according to $$e_h = R\tan(\beta)\tan\left(\frac{\beta}{2}\right)$$

-continued $$\beta = \arctan(\|\nabla f_z(X, Y)\|)$$

and adjusting the cutting tool's actual cutting point based on $e_h$.

13. A non-transitory machine-readable storage medium having instructions stored thereon for causing a processor to execute the method:

generating a signal for controlling fabrication of a coded lens from a workpiece;

causing a cutting tool to traverse a surface of the workpiece along a specified two-dimensional path, based on the signal;

controllably cutting a workpiece at a specified position-dependent depth while traversing the surface of the workpiece along the specified two-dimensional path, based on the signal;

ultrasonically vibrating the cutting tool for cutting gratings on the workpiece; and computing a three-dimensional freeform surface for machining a freeform lens from the workpiece, wherein computing the three-dimensional freeform surface is based on a Chebyshev polynomial $$Z = f_z(X, Y) = -\left( \frac{c\left(X^2 + Y^2\right)}{1 + \sqrt{1 - c^2\left(X^2 + Y^2\right)}} + \sum_{i=0}^{I}\sum_{j=0}^{J} C_{ij} T_i\!\left(\frac{X}{L_x}\right) T_j\!\left(\frac{Y}{L_y}\right) \right) + Z_0,$$

$$T_i(x) = \cos(i\arccos x)$$

where x, y, z are global coordinates, X, Y, Z are workpiece coordinates, $\rho$, $\theta$ are workpiece polar coordinates, $Z = f_z(X,Y)$ is a freeform surface function, $Z_0$ is a reference depth, $T_i(x)$ is a $i^{th}$ order Chebyshev polynomials at x, $C_{ij}$ is a 2-D Chebyshev polynomials coefficient, i, j are a order of Chebyshev polynomials, I, J are a maximum order of Chebyshev polynomials, c is a curvature of toric term.

14. The medium of claim 13, wherein the instructions for causing the cutting tool to traverse the surface of the workpiece along the specified two-dimensional path further comprise instructions for feeding the workpiece along a linear direction at a variable rate.

15. The medium of claim 13, wherein the instructions cause the processor to further execute the method operations:

causing the cutting tool to traverse the surface of the workpiece along quasi-spiral tool paths computed according to $$M_n \approx \frac{h/\Delta r}{\min\limits_{k=1,\ldots,K} \|\nabla f(X_{k,n}, Y_{k,n})\|},$$

where at a revolution m from 1 to $M_n$, the quasi-spiral tool path is computed by a interpolation, where a $k^{th}$ point on a $m^{th}$ revolution is labelled as $(X_{k,m}, Y_{k,m})$, where $$X_{k,m} = \frac{m(k-1)}{M_n K}(X_{k,n+1} - X_{k,n}) + X_{k,n},$$

$$Y_{k,m} = \frac{m(k-1)}{M_n K}(Y_{k,n+1} - Y_{k,n}) + Y_{k,n},$$

$$Z_{k,m} = f_z(X_{k,m}, Y_{k,m}) - (n-1)h + e_k(X_{k,m}, Y_{k,m}),$$

where $e_h(X_{k,m}, Y_{k,m})$ is a tool compensation term.

16. The medium of claim 13, wherein the instructions cause the processor to further execute the method operations:

causing the cutting tool to traverse the surface of the workpiece along the specified two-dimensional path computed according to $$\begin{bmatrix} X_{k,m} \\ Y_{k,m} \\ \nabla_x f(X_{k,m}, Y_{k,m}) \\ \nabla_y f(X_{k,m}, Y_{k,m}) \end{bmatrix} = \begin{bmatrix} \cos(\varphi_{k,m}) & \sin(\varphi_{k,m}) & 0 & 0 \\ -\sin(\varphi_{k,m}) & \cos(\varphi_{k,m}) & 0 & 0 \\ 0 & 0 & \cos(\varphi_{k,m}) & \sin(\varphi_{k,m}) \\ 0 & 0 & -\sin(\varphi_{k,m}) & \cos(\varphi_{k,m}) \end{bmatrix} \begin{bmatrix} x_{k,m} \\ y_{k,m} \\ -1 \\ 0 \end{bmatrix},$$

$$\frac{\partial f(X, Y)}{\partial X} =$$

$$\frac{cX}{\sqrt{1 - c^2\left(X^2 + Y^2\right)}} + \sum_{i=0}^{i}\sum_{j=0}^{j} C_{ij} \frac{i\sin\!\left(i\arccos\!\left(\frac{X}{L_x}\right)\right)}{\sqrt{1 - \left(\frac{X}{L_x}\right)^2}} \cos\!\left(j\arccos\!\left(\frac{Y}{L_y}\right)\right)$$

$$\frac{\partial f(X, Y)}{\partial Y} =$$

$$\frac{cX}{\sqrt{1 - c^2\left(X^2 + Y^2\right)}} + \sum_{i=0}^{i}\sum_{j=0}^{j} C_{ij}\cos\!\left(i\arccos\!\left(\frac{X}{L_x}\right)\right) \frac{j\sin\!\left(j\arccos\!\left(\frac{Y}{L_y}\right)\right)}{\sqrt{1 - \left(\frac{Y}{L_y}\right)^2}}$$

such that a cutting tool's trajectory in a workpiece coordinate system (X, Y, Z) is on a desired quasi-spiral, and a cutting direction is perpendicular to a local gradient.

17. The medium of claim 13, wherein the instructions cause the processor to further execute the method operations:

compensating for a deviation of a cutting tool's actual cutting point from the desired cutting point on the workpiece by computing $e_h$ according to $$e_h = R\tan(\beta)\tan\!\left(\frac{\beta}{2}\right)$$

$$\beta = \arctan(\|\nabla f_z(X, Y)\|)$$

and adjusting the cutting tool's actual cutting point based on $e_h$.

\* \* \* \* \*